(12) United States Patent
Ganiger et al.

(10) Patent No.: US 12,480,511 B2
(45) Date of Patent: Nov. 25, 2025

(54) COMPRESSOR BLEED SLOTS WITH VARIABLE WALL STRUCTURES

(71) Applicants: General Electric Company, Schenectady, NY (US); General Electric Company Polska sp. z o.o., Warsaw (PL)

(72) Inventors: Ravindra Shankar Ganiger, Bangalore (IN); Santosh Kumar Prasad, Bangalore (IN); Michal Tomasz Kuropatwa, Warsaw (PL)

(73) Assignees: General Electric Company, Evendale, OH (US); General Electric Company Polska sp. z o.o., Warsaw (PL)

(*) Notice: Subject to any disclaimer, the term of this patent is extended or adjusted under 35 U.S.C. 154(b) by 0 days.

(21) Appl. No.: 18/674,441

(22) Filed: May 24, 2024

(65) Prior Publication Data
US 2025/0347287 A1     Nov. 13, 2025

(30) Foreign Application Priority Data
May 10, 2024    (PL) ........................................ 448524

(51) Int. Cl.
*F02C 9/18*        (2006.01)
*F03G 7/06*        (2006.01)
*F04D 27/00*      (2006.01)
*F04D 29/56*      (2006.01)

(52) U.S. Cl.
CPC ......... *F04D 27/009* (2013.01); *F03G 7/0614* (2021.08); *F04D 29/563* (2013.01)

(58) Field of Classification Search
CPC .... F04D 27/009; F04D 29/563; F03G 7/0614; F02C 9/18
See application file for complete search history.

(56) References Cited

U.S. PATENT DOCUMENTS

| | | | |
|---|---|---|---|
| 5,971,327 | A | 10/1999 | Loth |
| 6,334,297 | B1 | 1/2002 | Dailey et al. |
| 8,893,512 | B2 | 11/2014 | Donahoo et al. |
| 9,108,737 | B2 | 8/2015 | Zysman |
| 9,261,022 | B2 | 2/2016 | Saha et al. |
| 9,297,310 | B2 | 3/2016 | Giri et al. |
| 10,036,273 | B2 | 7/2018 | Kozuch et al. |
| 10,928,839 | B2 | 2/2021 | Glezer et al. |
| 10,941,664 | B2 | 3/2021 | Osgood et al. |
| 11,085,372 | B2 | 8/2021 | Mackin et al. |
| 11,852,272 | B2 | 12/2023 | Namadevan et al. |
| 2009/0226327 | A1 | 9/2009 | Little et al. |

(Continued)

*Primary Examiner* — Steven M Sutherland
(74) *Attorney, Agent, or Firm* — Hanley, Flight & Zimmerman, LLC

(57) ABSTRACT

Compressor bleed slots with variable wall structures are disclosed herein. An example apparatus disclosed herein is to be coupled to a wall of a bleed slot of a compressor of a gas turbine engine, the bleed slot defining a flow path, the apparatus comprising a member to be coupled to the wall, and a plate coupled to the member, the plate having a first geometry at a first ambient condition at a first time, the flow path having a first area when the plate has the first geometry, and a second geometry at a second ambient condition at a second time, the flow path having a second area when the plate has the second geometry, the first area greater than the second area, the first time after the second time.

19 Claims, 13 Drawing Sheets

(56) References Cited

U.S. PATENT DOCUMENTS

| | | | | |
|---|---|---|---|---|
| 2010/0276025 | A1* | 11/2010 | Sellers | F03G 7/065 |
| | | | | 138/45 |
| 2015/0059315 | A1* | 3/2015 | Siering | F04D 27/023 |
| | | | | 60/226.3 |
| 2016/0123235 | A1* | 5/2016 | Siering | F02C 9/18 |
| | | | | 415/1 |
| 2019/0323433 | A1 | 10/2019 | Bewick et al. | |

* cited by examiner

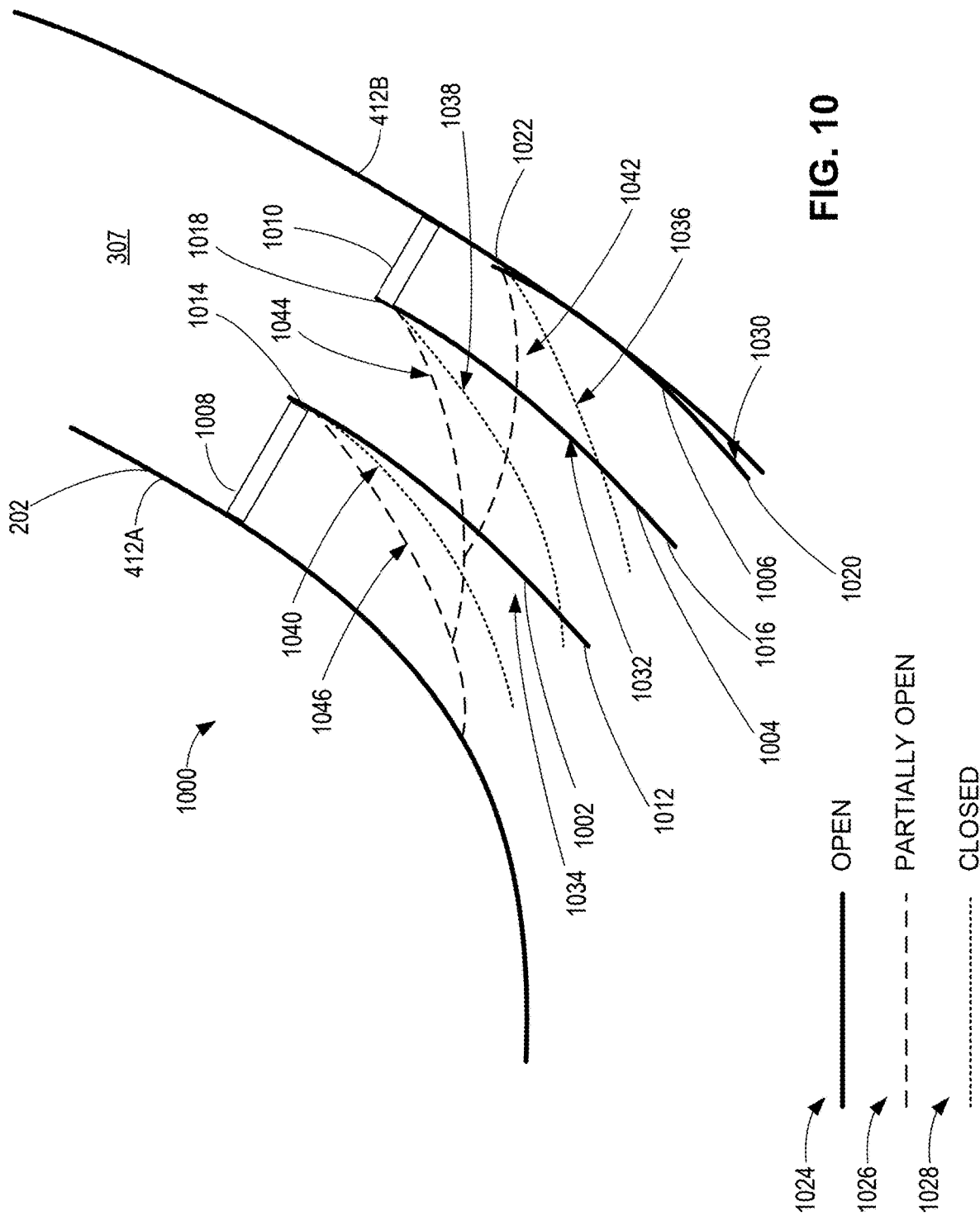

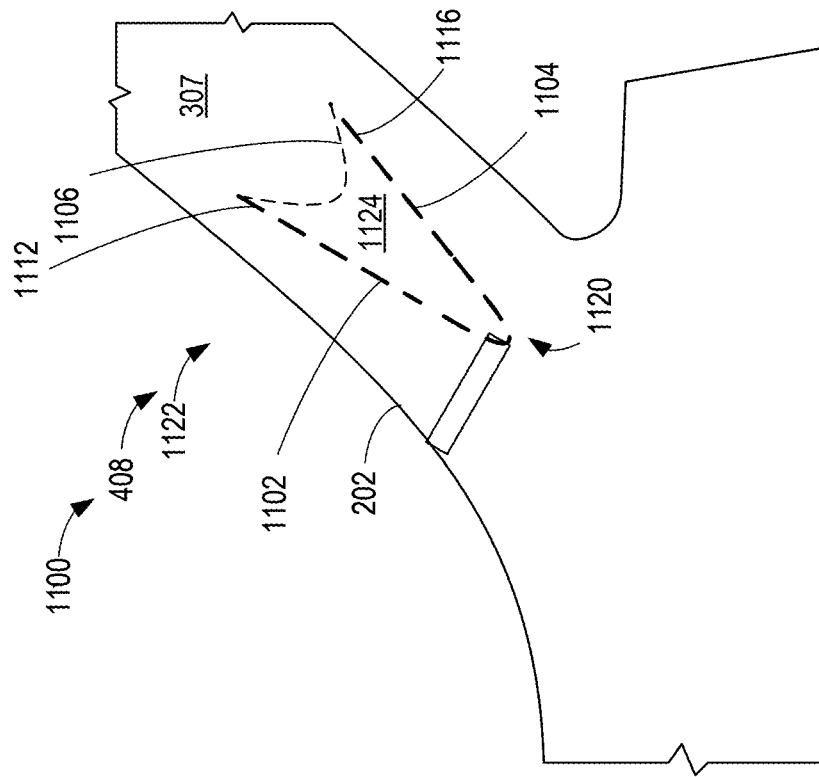
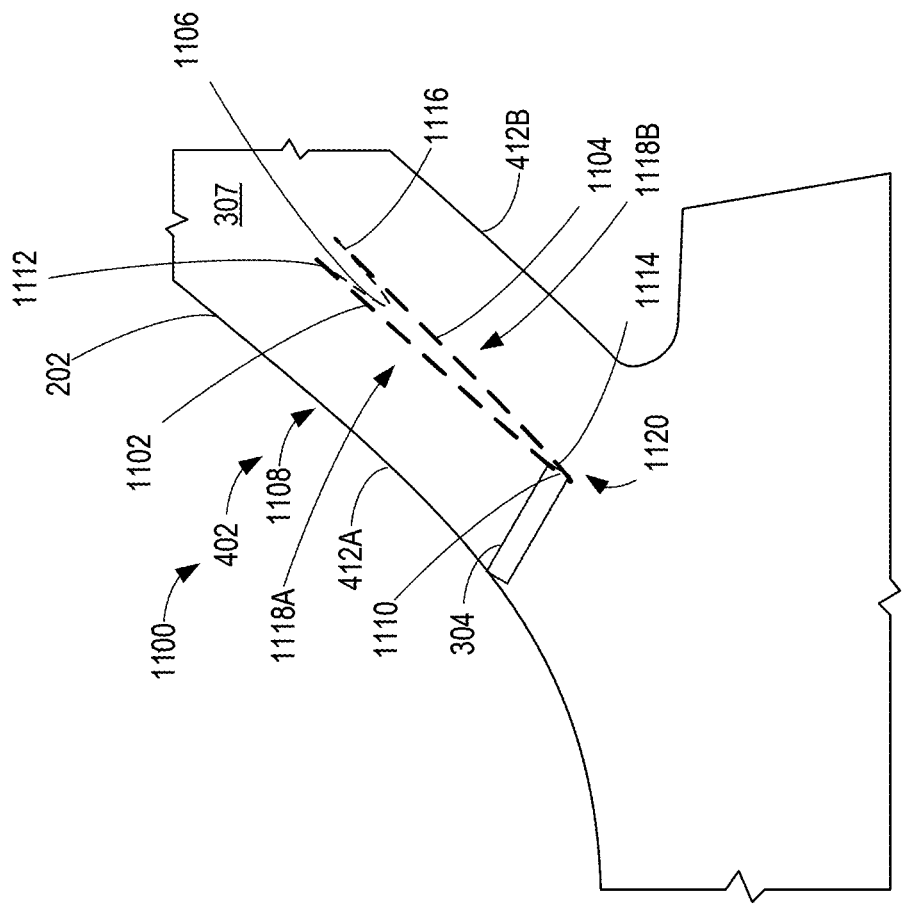

COMPRESSOR BLEED SLOTS WITH VARIABLE WALL STRUCTURES

RELATED APPLICATION

This patent claims priority to Polish Patent Application No. P.448524, filed on May 10, 2024 and entitled "COMPRESSOR BLEED SLOTS WITH VARIABLE WALL STRUCTURES," which is incorporated herein by reference in its entirety.

FIELD OF THE DISCLOSURE

This disclosure relates generally to gas turbines and, more particularly, to compressor bleed slots with variable wall structures.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

BRIEF DESCRIPTION OF THE DRAWINGS

A full and enabling disclosure, including the best mode thereof, directed to one of ordinary skill in the art, is set forth in the specification, which makes reference to the appended FIGS., in which:

FIG. 10 is a schematic view of the bleed slot of FIG. 2 including an example fourth variable wall structure implemented in accordance with teachings of this disclosure.

FIG. 11A is a schematic view of the bleed slot of FIG. 2 and an example fifth variable wall structure implemented in accordance with teachings of this disclosure and in an example first position.

FIG. 11B is a schematic view of the bleed slot of FIG. 2 and the fifth variable wall structure of FIG. 11A in an example second position.

In general, the same reference numbers will be used throughout the drawing(s) and accompanying written description to refer to the same or like parts. The figures are not necessarily to scale.

DETAILED DESCRIPTION

Figure 1:
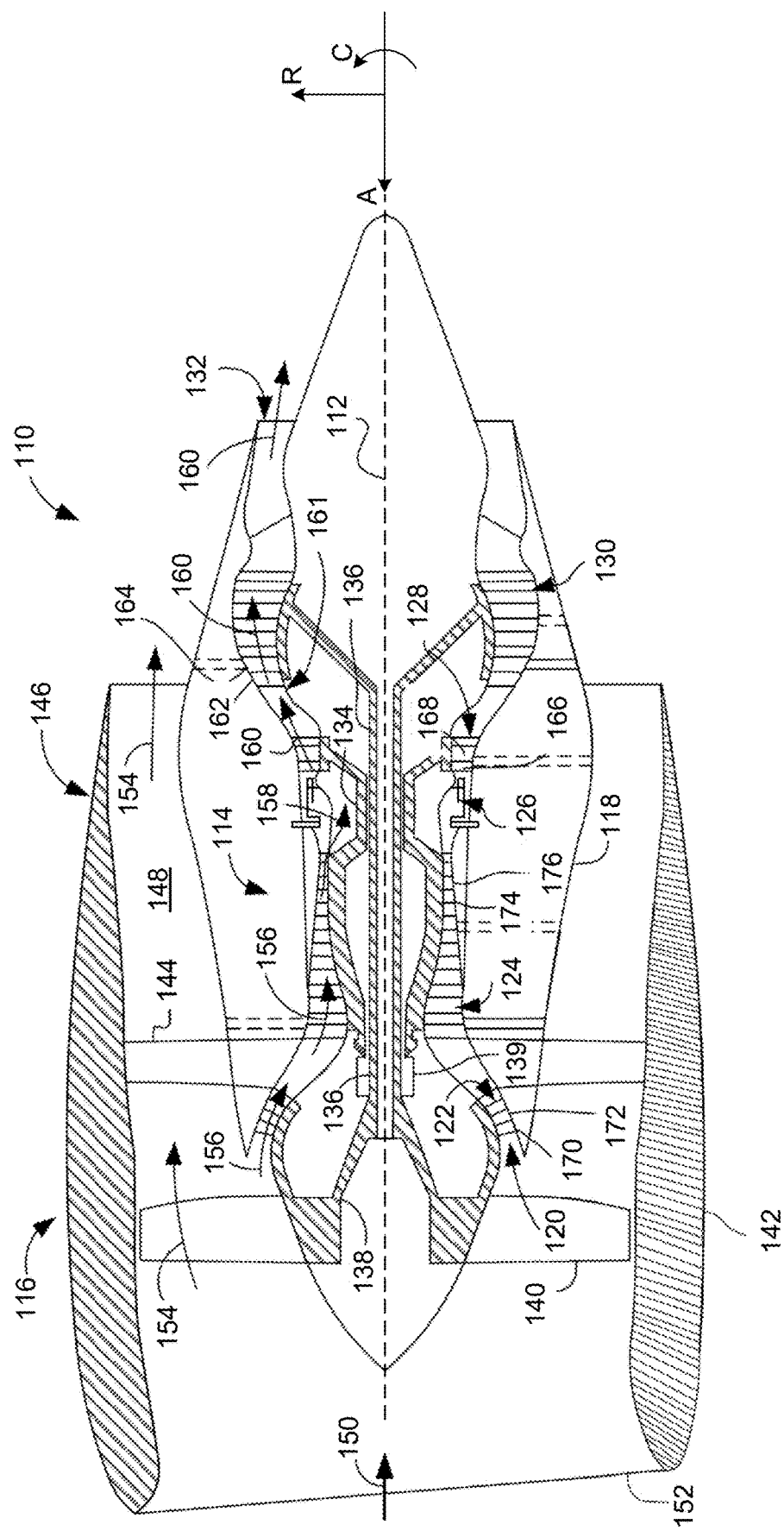
FIG. 1 is a cross-sectional view of an example gas turbine engine in which examples disclosed herein may be implemented.

Some gas turbine engines include bleed systems, which direct air from the cold section of the gas turbine engine (e.g., the high pressure compressor, the low pressure compressor, etc.) to another location, such as the bypass flow path, the cabin, the hot section of the gas turbine engine, etc. Extracting air from the main flow path of the compressor into a bleed slot can cause excessive pressure loss due to turbulent effects at the entry of the bleed slot, particularly during low power conditions. Examples disclosed herein mitigate pressure losses in bleed cavities and include variable wall structures that are moveable between a plurality of positions during operation of the gas turbine engine. Example variable wall structures disclosed herein are passively controlled via an ambient condition of the compressor. Some example variable wall structures disclosed herein include shape memory alloys and/or bimetallic structures that are moveable between different geometries based on the ambient temperature of the compressor. Some example variable wall structures disclosed herein include biasing members that are moveable between different geometries based on the ambient pressure of the compressor. Example variable wall structures disclosed herein reduce vortex formation in compressor bleed slots and reduce pressure losses of compressor bleed systems (e.g., increase pressure recovery, etc.).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used in this document, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

The terms "upstream" and "downstream" refer to the relative direction with respect to fluid flow in a fluid pathway. For example, "upstream" refers to the direction from which the fluid flows, and "downstream" refers to the direction to which the fluid flows. Various terms are used herein to describe the orientation of features. In general, the attached figures are annotated with reference to the axial direction, radial direction, and circumferential direction of the gas turbine associated with the features, forces, and moments. As used herein, describing two features and/or axes as parallel refers to features that are approximately parallel.

Gas turbine engines include bleed systems, which extract bleed air from the cold section of the gas turbine engines and direct the bleed air to another location. Bleed air can be used to cool engine components (e.g., hot section components, etc.), remove ice from aircraft components, remove excess air from the compressor, and/or other applications. The pressure of bleed air is directly related to the usefulness of the bleed air. That is, greater bleed air pressures enable additional work to be extracted from the bleed air. The curvature of compressor slots and related turbulence effects, such as recirculation and vortex formation, can cause significant pressure losses in bleed air (e.g., lower pressure recovery, etc.). In some examples, recirculation in bleed slots can be greater in particular engine conditions such as low power engine conditions. The pressure losses associated with bleed slots reduce the efficiency of extracted bleed air and can lower engine efficiency.

Examples disclosed herein mitigate pressure losses associated with compressor bleed slots and include variable wall structures disposed in the bleed slots of the compressor of gas turbine engines. The variable wall structures disclosed herein are moveable during operation of the gas turbine engine and can change the flow area of the bleed slots during different operation conditions of the gas turbine engine. Some example variable wall structures disclosed herein are passively controlled based on the ambient conditions of the bleed cavity, such as the ambient temperature and/or the ambient pressure. As used herein, the "ambient condition" of a bleed cavity refers to the condition (e.g., the temperature distribution, the pressure distribution, etc.) associated with a corresponding operating condition of the gas turbine engine (e.g., the bleed cavity has a first ambient condition during takeoff, the bleed cavity has a second ambient condition during cruise, etc.). As used herein, the phrases "ambient condition," "surrounding condition," and "cavity condition" are used interchangeably. Some example variable wall structures disclosed herein include smart memory alloy (SMA) walls and/or bimetallic walls that assume different shapes based on the ambient temperature of the bleed slot. Some example variable wall structures disclosed herein include springs to control the position of the walls based on the ambient pressure of the bleed slot. Some example variable wall structures disclosed herein include perforations to enable air to flow through the walls and reduce negative acoustic effects.

Referring now to the drawings, wherein identical numerals indicate the same elements throughout the figures, FIG. 1 is a schematic cross-sectional view of a gas turbine engine 110. In the illustrated example of FIG. 1, the gas turbine engine 110 is a high-bypass turbofan engine. While the illustrated example is a high-bypass turbofan engine, the principles of the present disclosure are also applicable to other types of engines, such as low-bypass turbofans, turbojets, turboprops, etc. As shown in FIG. 1, the gas turbine engine 110 defines a longitudinal or axial centerline axis 112 extending therethrough for reference. FIG. 1 also includes an annotated directional diagram with reference to an axial axis A, a radial axis R, and a circumferential axis C.

In general, the gas turbine engine 110 includes a core turbine 114 disposed downstream from a fan section 116. The core turbine 114 includes a substantially tubular outer casing 118 that defines an annular inlet 120. The outer casing 118 can be formed from a single casing or multiple casings. The outer casing 118 encloses, in serial flow relationship, a compressor section having a booster or low-pressure compressor 122 ("LP compressor 122") and a high pressure compressor 124 ("HP compressor 124"), a combustion section 126, a turbine section having a high pressure turbine 128 ("HP turbine 128") and a low-pressure turbine 130 ("LP turbine 130"), and an exhaust section 132. A high pressure shaft or spool 134 ("HP shaft 134") drivingly couples the HP turbine 128 and the HP compressor 124. A low-pressure shaft or spool 136 ("LP shaft 136") drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be partially supported relative to the core turbine 114 by a plurality of circumferentially spaced apart outlet guide vanes 144. Furthermore, a downstream section of the nacelle 142 can enclose an outer portion of the core turbine 114 to define a bypass airflow passage 148 therebetween.

As illustrated in FIG. 1, air 150 enters an inlet portion 152 of the gas turbine engine 110 during operation thereof. A first portion 154 of the air 150 flows into the bypass airflow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a flow path between the high-pressure and low-pressure turbines and can be formed using metallic castings (e.g., nickel-based cast metallic alloys, etc.).

Along with the gas turbine engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gear 139) can be included between any shafts and spools. For example, the reduction gear 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing and form an aerodynamic transition duct between the HP turbine 128 and the LP turbine 130. As such, air flows through the turbine frame 161 between the HP turbine 128 and the LP turbine 130.

Figure 2:
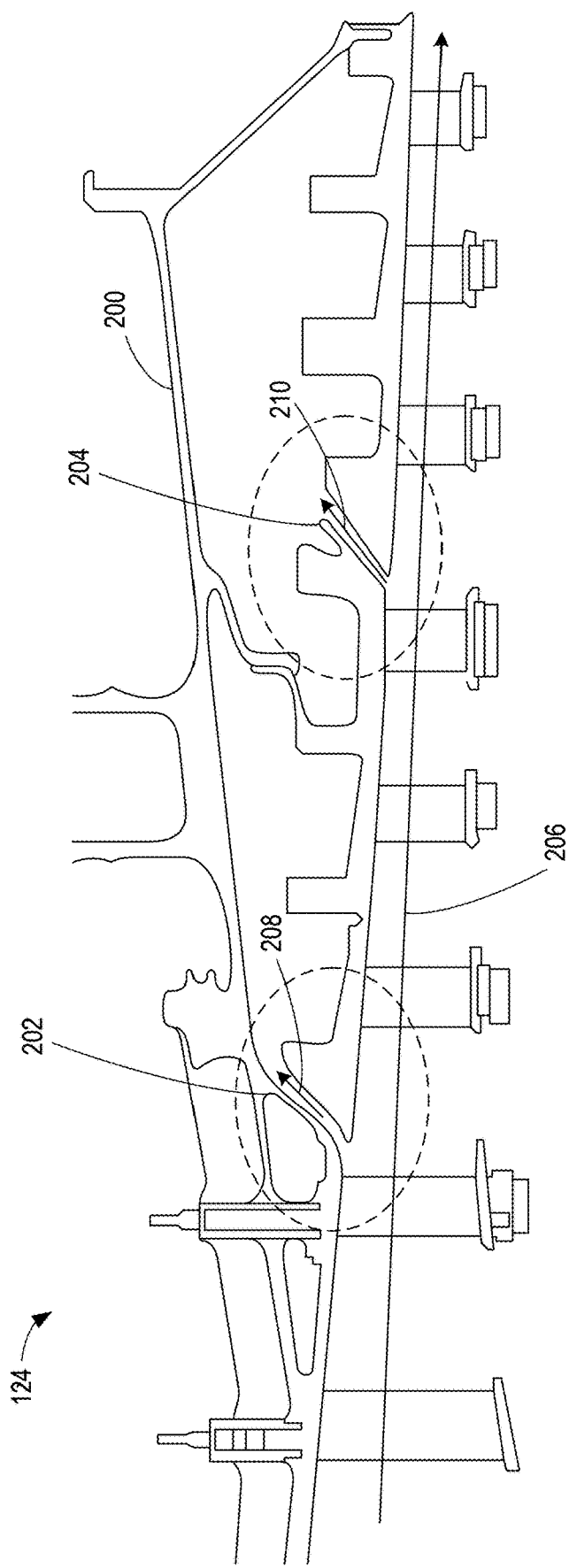
FIG. 2 is a partial cross-sectional view of an example compressor of the gas turbine engine of FIG. 1.

FIG. 2 is a partial cross-sectional view of an example compressor casing 200 of the HP compressor 124 of the gas turbine engine 110 of FIG. 1. In the illustrated example of FIG. 2, the HP compressor 124 includes a first bleed slot 202 and a second bleed slot 204. The compressor casing 200 defines a main flow path 206, which extends through the HP compressor 124 into downstream turbomachinery components of the gas turbine engine 110. In the illustrated example of FIG. 2, a first bleed flow path 208 extends from the main flow path 206 into the first bleed slot 202. The compressor casing 200 and the first bleed slot 202 are described in additional detail in conjunction with FIGS. 5-8.

During operation of the gas turbine engine 110, air flows along the main flow path 206 and is compressed and guided via the HP compressor rotor blades 176. A portion of the air exits the main flow path 206 and enters along the first bleed flow path 208 (e.g., a first secondary flow path, etc.) the first bleed slot 202. The air in the first bleed slot 202 can be exhausted and/or utilized at another location of the aviation system associated with the HP compressor 124 (e.g., deicing, cooling a hot section component of the gas turbine engine, pressure an aircraft associated with the gas turbine engine 110, etc.). Another portion of the air exits the main flow path 206 along a example second bleed flow path 210 (e.g., a second secondary flow path, etc.). The utilization of multiple bleed slots enables compressed air to be extracted from the HP compressor 124 at different temperatures and/or pressures (e.g., the air extracted from the first bleed slot 202 is at a lower pressure and temperature than the air extracted via the second bleed slot 204, etc.). While the example bleed slots and variable wall structures are described with reference to the first bleed slot 202 of the HP compressor 124 of FIG. 1, the variable wall structures disclosed herein can be used in conjunction with bleed slots located at other locations in the HP compressor 124 (e.g., the second bleed slot 204, etc.) and/or other components of the gas turbine engine (e.g., the LP compressor 122, etc.).

Figure 3:
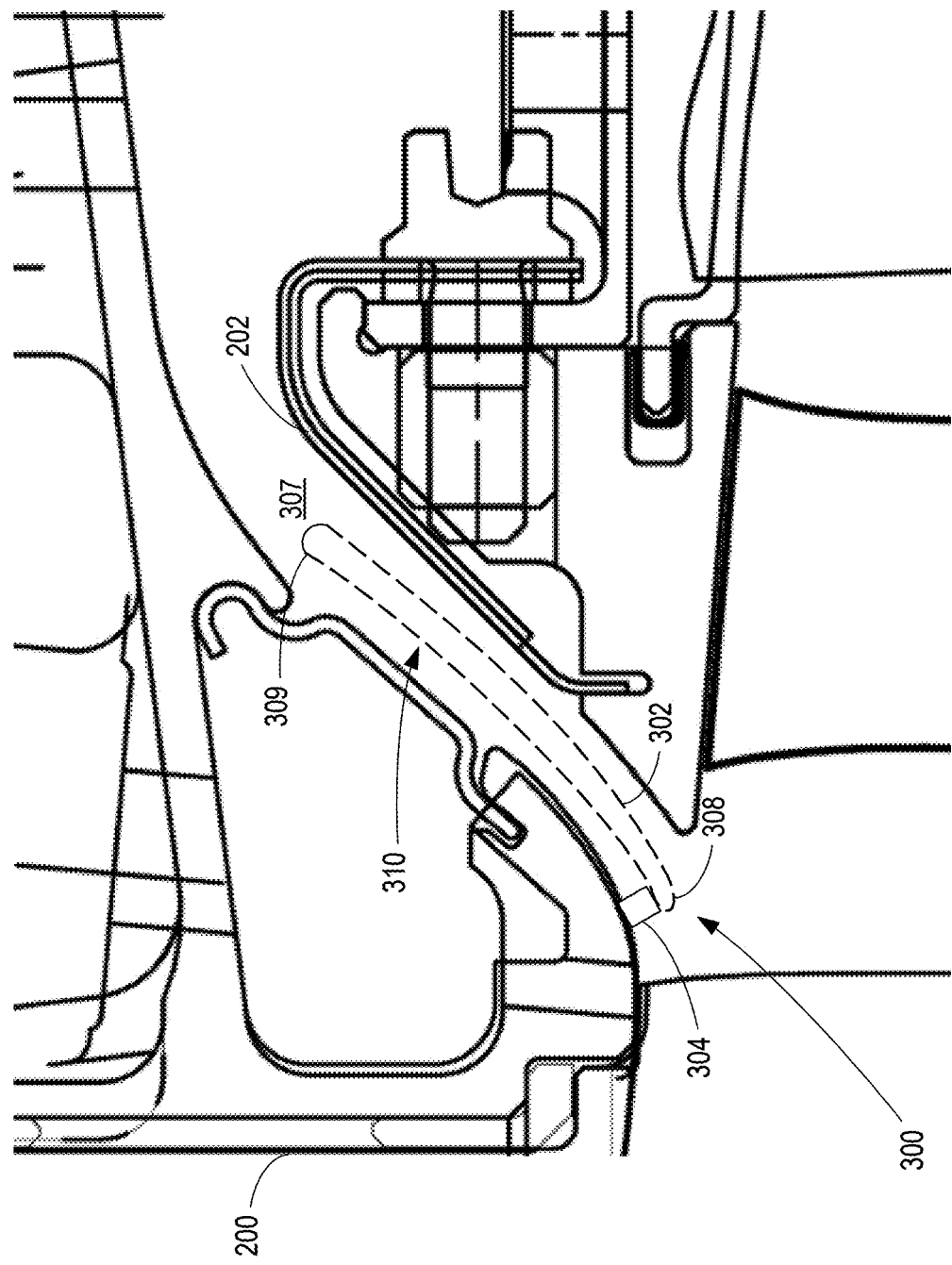
FIG. 3 is a cross-sectional view of a bleed slot of the compressor of FIG. 1 including a first variable wall structure implemented in accordance with teachings of this disclosure.

FIG. 3 is a cross-sectional view of the first bleed slot 202 of the HP compressor 124 of FIG. 1 including an example first variable wall structure 300 implemented in accordance with teachings of this disclosure. In the illustrated example of FIG. 3, the first variable wall structure 300 includes a plate 302 and a member 304. While the variable wall structure 300 of FIG. 3 is disposed in the first bleed slot 202, the variable wall structures described herein can be disposed in other bleed slots of gas turbine engine, including the second bleed slot 204 of FIG. 2.

The plate 302 is a variable geometry structure that is disposed in a bleed cavity 307 of the first bleed slot 202. As used herein, "a variable geometry structure" is a structure that is designed to be configurable (e.g., moveable, etc.) between a plurality of configurations, positions, and/or orientations during standard operation of the structure. In the illustrated example of FIG. 3, the plate 302 includes a first end 308 coupled to the member 304 and a second end 309 that is cantilevered within the bleed cavity 307 (e.g., uncoupled to the sides of the first bleed slot 202, suspended in the bleed cavity 307, etc.). During the operation of the first variable wall structure 300, the second end 309 moves relative to the first end 308, which causes the plate 302 to bend and assume different geometries. The variable geometry of the plate 302 causes the flow area through the first bleed slot 202 to change. For example, the plate 302 can bend to block a portion (e.g., some of the first bleed slot 202, all of the first bleed slot 202, etc.) to reduce the volume of bleed air flowing through the cavity. In some examples, the reduced volume of air and/or the modified geometry of the first bleed slot 202 can reduce vortex formation and/or other flow effects that reduce the pressure recovery of the first bleed slot 202. Examples of the variable geometries of the first variable wall structure 300 of FIG. 3 are described below in conjunction with FIGS. 4A and 4B. As used herein, the terms "plate" and "wall" are used interchangeably to refer to the variable geometry structures of the variable wall structures disclosed herein.

In some examples, the plate 302 is composed of a smart metal alloy (SMA). For example, the plate 302 can be composed of any suitable SMA (e.g., a copper-aluminum-nickel alloy, a nickel-titanium alloy, an iron-magnesium-tin alloy, a copper-zinc-aluminum alloy, a copper-aluminum-nickel alloy, etc.). In such examples, as the plate 302 is heated (e.g., during hotter engine conditions such as takeoff, etc.), the SMA assumes a different pre-configured shape. Additionally or alternatively, the plate 302 can be composed of multiple layers of material. For example, the plate 302 can be composed of two layers of different metals (e.g., a bimetallic construction, etc.) that are rigidly coupled and have different coefficients of thermal expansion. For example, the plate 302 can include a first layer composed of aluminum, titanium, steel, nickel alloy, and/or another metal and a second layer composed of a different metal (e.g., a different titanium, a different nickel alloy, a different steel, etc.). As the plate 302 is heated, the materials of the plate 302 expand at different rates, which causes the plate 302 to flex. In some such examples, the size and materials of the plate 302 can be selected to modify the bending profile of the plate 302.

In the illustrated example of FIG. 3, the plate 302 includes a plurality of openings 310 (e.g., perforations, gaps, holes, etc.). In the illustrated example of FIG. 3, the openings 310 have a uniform pattern. In some examples, the openings 310 are disposed in a grid pattern. In other examples, the openings 310 can have any other suitable uniform arrangement. In other examples, the openings 310 can be disposed in a non-uniform arraignment (e.g., a random arrangement, etc.). The openings 310 enable air to pass through the plate 302 during operation of the gas turbine engine 110. In some examples, the openings 310 damp (e.g., dampen, etc.) the acoustic effects associated with the flow of air over the plate 302. In the illustrated example of FIG. 3, the openings 310 are circular holes. In other examples, the openings 310 can have any other shape (e.g., polygons, slots, ovoid, irregular, etc.). In other examples, the openings 310 are absent (e.g., the plate 302 is a solid, etc.).

The member 304 couples the plate 302 within the first bleed slot 202. The member 304 is a rigid structure that supports (e.g., suspends, etc.) the plate 302 in the bleed cavity 307. In some examples, the member 304 includes at least one of a strut (e.g., one strut, multiple struts, etc.), a lattice (e.g., a honeycomb lattice, a triangular lattice, a cubic lattice, a tetragonal lattice, a higher dimension Bravais lattice, etc.), and/or a corrugated sheet (e.g., a bent sheet, etc.). In other examples, the member 304 can be implemented by any other suitable rigid air permeable structure (e.g., a rigid mesh, etc.). In the illustrated example of FIG. 3, the member 304 extends radially and longitudinally. In other examples, the member 304 can be disposed in a circumferential direction (e.g., into and out of the sheet, etc.).

Figure 4B:
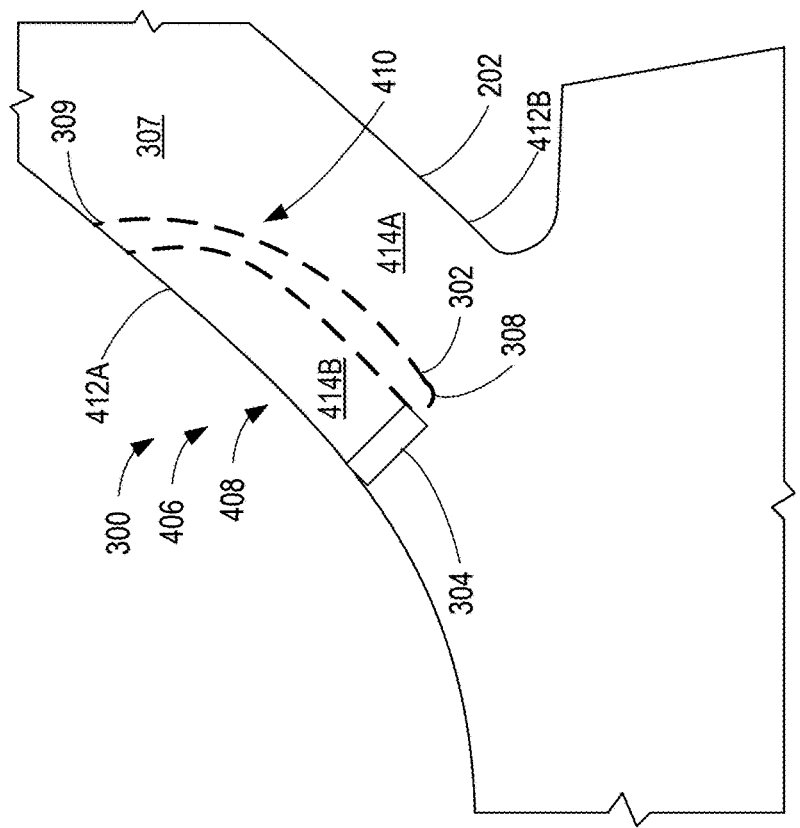
FIG. 4B is a schematic view of the bleed slot and the first variable wall structure of FIG. 3 in an example second geometry.
Figure 4A:
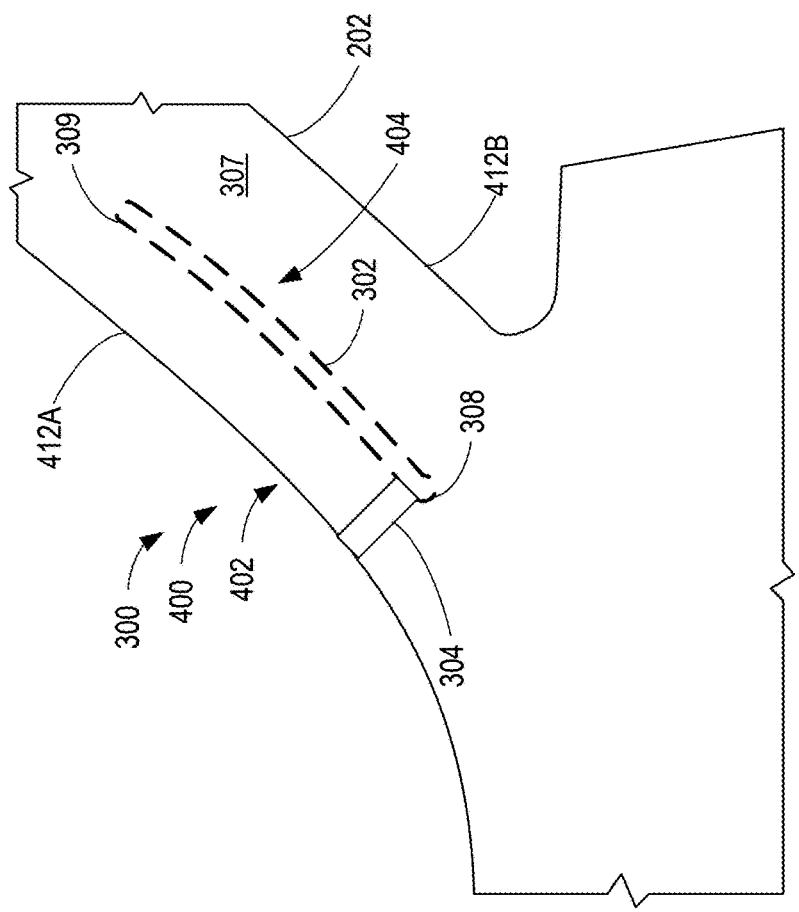
FIG. 4A is a schematic view of the bleed slot and the first variable wall structure of FIG. 3 in an example first geometry.

FIG. 4A is a schematic view of the first bleed slot 202 and the first variable wall structure 300 of FIG. 3 in a first geometry 400. In the illustrated example of FIG. 4A, the first bleed slot 202 has a first ambient condition 402. In some examples, the first ambient condition 402 is a high-power engine condition (e.g., a high-temperature condition, a high-pressure condition, a high-speed condition, etc.). As used herein, the phrases "high power engine condition" and "low power engine condition" are used to describe operational states of the gas turbine engine 110. As used herein, the phrase "high power engine condition" refers to comparatively high throttle conditions of the gas turbine engine 110. For example, the first ambient condition 402 can be associated with high-power flight phases of the gas turbine engine 110 (e.g., takeoff, climb, etc.) and/or comparatively higher throttle positions of the gas turbine engine 110 (e.g., maneuvering engine conditions, a full power engine condition, 90% power engine condition, etc.). As used herein, the phrase "low power engine condition" refers to comparatively low throttle conditions of the gas turbine engine 110 (e.g., when compared to high power engine conditions, etc.). For example, the second ambient condition 408 can be associated with a low power condition of the gas turbine engine 110 (e.g., cruise, ground idle, etc.).

In the illustrated example of FIG. 4A, the plate 302 of the first variable wall structure 300 has a first curvature 404. That is, in the first geometry 400, the plate 302 has the first curvature 404. In some examples, the first ambient condition 402 causes the plate 302 to assume the first curvature 404. In the illustrated example of FIG. 4A, with the first curvature 404, the plate 302 is approximately planar. In the illustrated example of FIG. 4A, the first end 308 and the second end 309 are approximately co-planar (e.g., the ends 308, 309 occupy the same geometric plane, the plate 302 is flat, etc.). In other examples, the first curvature 404 can be non-planar. For example, the first curvature 404 can be complementary to the curvature of the bleed cavity 307 (e.g., the first curvature 404 of the plate 302 is parallel to the curvature of the interior of the first bleed slot 202, etc.). In some such examples, the plate 302 is equally spaced from an upstream wall 412A (e.g., an upstream edge, etc.) and a downstream wall 412B (e.g., an upstream edge, etc.) of the bleed cavity 307. In the illustrated example of FIG. 4A, the first curvature 404 does not substantially inhibit the flow of air through the first bleed flow path 208.

FIG. 4B is a schematic view of the first bleed slot 202 and the first variable wall structure 300 of FIG. 3 in a second geometry 406. In the illustrated example of FIG. 4B, the first bleed slot 202 has a second ambient condition 408. In some examples, the second ambient condition 408 is a low-power engine condition (e.g., a comparatively low-temperature condition, a comparatively low-pressure condition, etc.). That is, the temperature and pressure associated with the second ambient condition 408 are less than the temperature and pressure associated with the first ambient condition 402. In other examples, the second ambient condition 408 can be any other suitable engine condition. It should be appreciated that the first ambient condition 402 of FIG. 4A and the second ambient condition 408 can occur during a same operation of the gas turbine engine 110. For example, the first ambient condition 402 can occur during a first time during a flight (e.g., takeoff, etc.) and a second ambient condition 408 can occur during a second time later in the same flight (e.g., cruise, ground idle, etc.). It should also be appreciated that the ambient conditions 402, 408 can occur within the gas turbine engine 110 multiple times during a single flight operation.

In the illustrated example of FIG. 4B, the plate 302 of the first variable wall structure 300 has a second curvature 410. That is, in the second geometry 406, the plate 302 has the second curvature 410. In the illustrated example of FIG. 4B, with the second curvature 410, the plate 302 is non-planar (e.g., the second curvature 410 is a non-planar curvature, the first curvature 404 is a convex curvature, the second curvature 410 is a concave curvature, etc.). For example, the comparatively reduced temperature of the second ambient condition 408 when compared to the first ambient condition 402 causes the SMA of the plate 302 to assume the second curvature 410. In the illustrated example of FIG. 4B, in the second geometry 406, the second end 309 is deflected (e.g., displaced, etc.) toward the upstream wall 412A of the first bleed slot 202. In the illustrated example of FIG. 4B, the deflection of the plate 302 creates an unblocked region 414A and a blocked region 414B, which reduces the flow area of the first bleed flow path 208 compared to the approximately planar position of the plate 302 of FIG. 4A (e.g., compared to the first geometry 400 of FIG. 4A, etc.).

In the illustrated example of FIG. 4B, the second geometry 406 and the second curvature 410 cause the second end 309 to be deflected upstream relative to the main flow path of the HP compressor 146. As such, in the illustrated example of FIG. 4B, the unblocked region 414A is downstream of the blocked region 414B relative to the main flow path 206 (e.g., the unblocked region 414A is upstream of the blocked region 414B, etc.). In other examples, the regions 414A, 414B can have other shapes, spatial relationships, and/or dimensions. For example, the unblocked region 414A can be upstream of the blocked region 414B. In other examples, the regions 414A, 414B can be arranged circumferentially within the first bleed slot 202.

The blocked region 414B inhibits (e.g., blocks, slows, reduces, etc.) the flow of air through the first bleed slot 202. For example, if the plate 302 includes the openings 310, the plate 302 reduces the flow rate of air through the blocked region 414B. In other examples, if the openings 310 are absent, the plate 302 prevents the flow of air through the blocked region 414B. In some examples, the plate 302 reduces recirculation (e.g., eddies, vortexes, whirlpools, etc.) and/or other turbulent effects in the blocked region 414B associated with the turning of air from the main flow path 206 of FIG. 2 to the first bleed flow path 208 of FIG. 2. In some examples, the reduction in recirculation and other turbulent effects increases the pressure recovery of the first bleed slot 202. As such, the first variable wall structure 300 of FIGS. 3-4B increases the pressure of bleed air extracted from the first bleed slot 202 and the usefulness of the extracted bleed air. That is, the first variable wall structure 300 reduces the pressure drop within the first bleed slot 202, which maintains the pressure and energy of the extracted bleed air.

Figure 5:
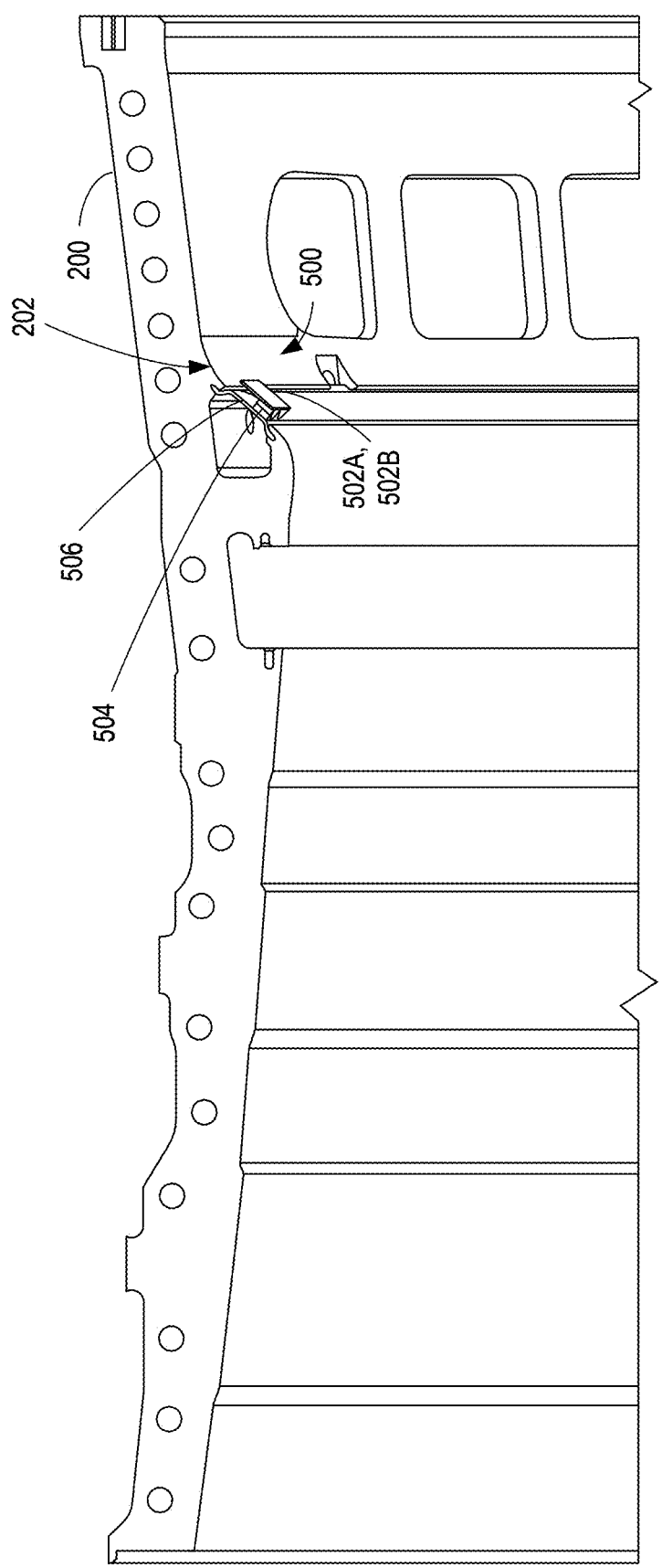
FIG. 5 is a cross-sectional side view of the compressor of FIG. 2 including an example second variable wall structure implemented in accordance with teachings of this disclosure.
Figure 6:
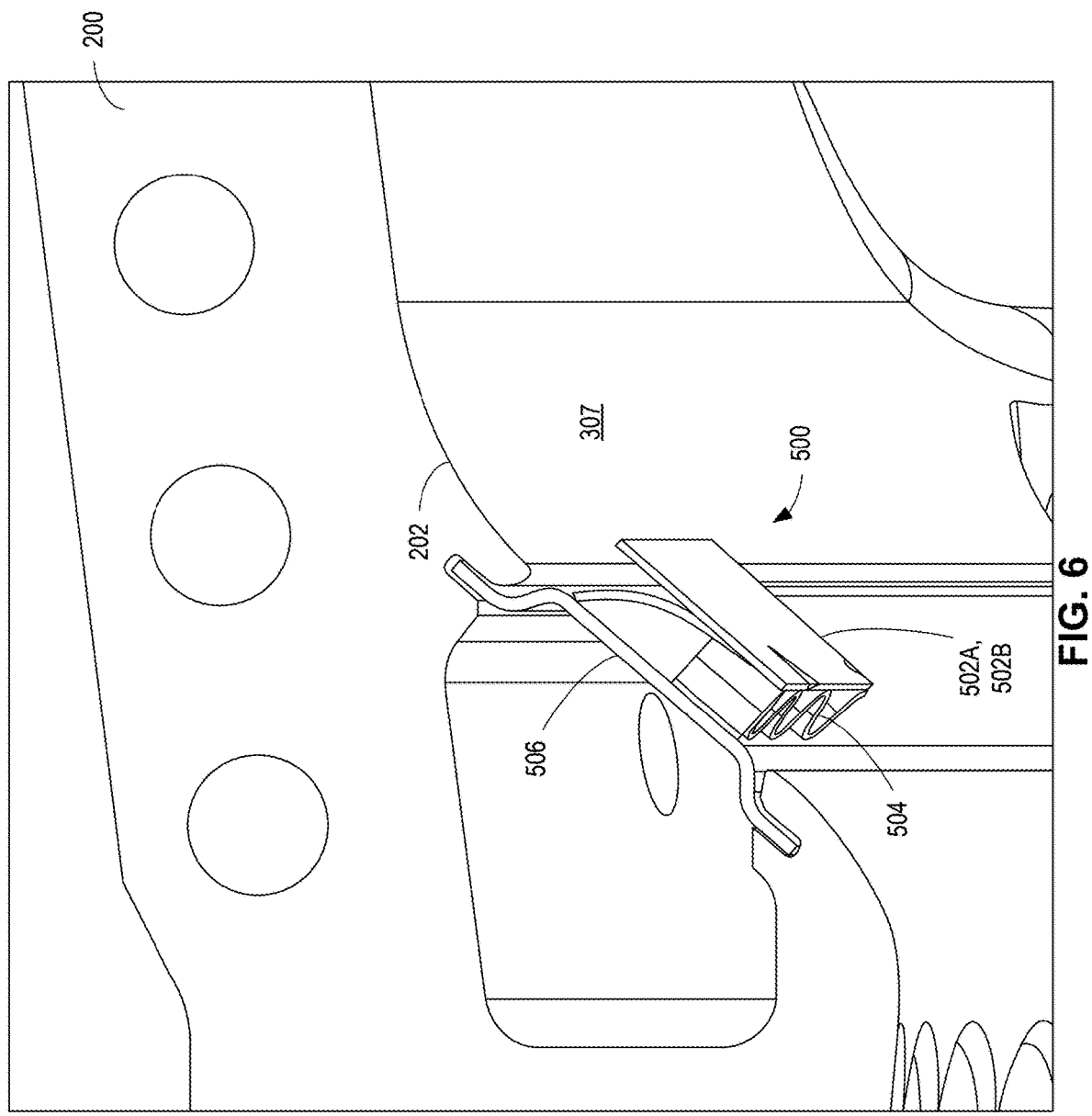
FIG. 6 is a cross-sectional perspective view of the second variable wall structure of FIG. 5.

FIG. 5 is a cross-sectional side view of the compressor casing 200 of FIG. 2 including an example second variable wall structure 500 implemented in accordance with teachings of this disclosure. FIG. 6 is a perspective view of the second variable wall structure 500 in the first bleed slot 202 of the compressor casing 200. The second variable wall structure 500 is similar to the first variable wall structure 300 of FIGS. 3-4B except as noted otherwise herein. In the illustrated examples of FIGS. 5 and 6, the second variable wall structure 500 includes a first plate 502A, a second plate 502B, and a member 504. In the illustrated examples of FIGS. 5 and 6, the member 504 is coupled to a deflection plate 506 with the first bleed slot 202 of FIG. 2.

In the illustrated examples of FIGS. 5 and 6, the second variable wall structure 500 includes two plates (e.g., the plates 502A, 502B, etc.). In other examples, the second variable wall structure 500 can include a different quantity of plates (e.g., one plate, three plates, etc.). In some examples, the second variable wall structure 500 can depend on the size (e.g., area, length, width, etc.) of the first bleed slot 202, the stiffness of the plates 502A, 502B, and/or the thickness of the plates 502A, 502B. For example, the stiffness, size, and/or thickness of the plates 502A, 502B can affect the temperature sensitivity of the geometry of the plates 502A, 502B (e.g., higher stiffness and/or thicknesses of the plates 502A, 502B can reduce the temperature sensitivity of the second variable wall structure 500, etc.). In some examples, the utilization of multiple plates (e.g., the plates 502A, 502B, etc.) enables the plates 502A, 502B to approximate the curvature of the first bleed slot 202 (e.g., the circumferential curvature of the gas turbine engine 110, etc.). Like the plate 302 of FIGS. 3, one or both of the plates 502A, 502B can be composed of a shape memory alloy (SMA). Additionally or alternatively, one or both of the plates 502A, 502B can be composed of two or more metallic layers (e.g., a bimetallic construction including materials with different coefficients, etc.). In the illustrated example of FIG. 5, the plates 502A, 502B do not include openings (e.g., perforations, openings similar to the openings 310 of FIG. 3, etc.). In other examples, one or both of the plates 502A, 502B can include one or more openings to facilitate the flow of bleed flow therethrough.

The deflection plate 506 is a thin wall structure that is coupled to the compressor casing 200 in the first bleed slot 202. In the illustrated example of FIG. 2, the deflection plate 506 is the bleed cavity 307 of the first bleed slot 202 (e.g., an outer surface of the deflection plate 506 partly defines the first bleed flow path 208, etc.). The member 504 couples the plates 502A, 502B to the deflection plate 506. In other examples, the deflection plate 506 is absent. In some such examples, the member 504 can be coupled to a solid portion of the compressor casing 200.

Figure 7:
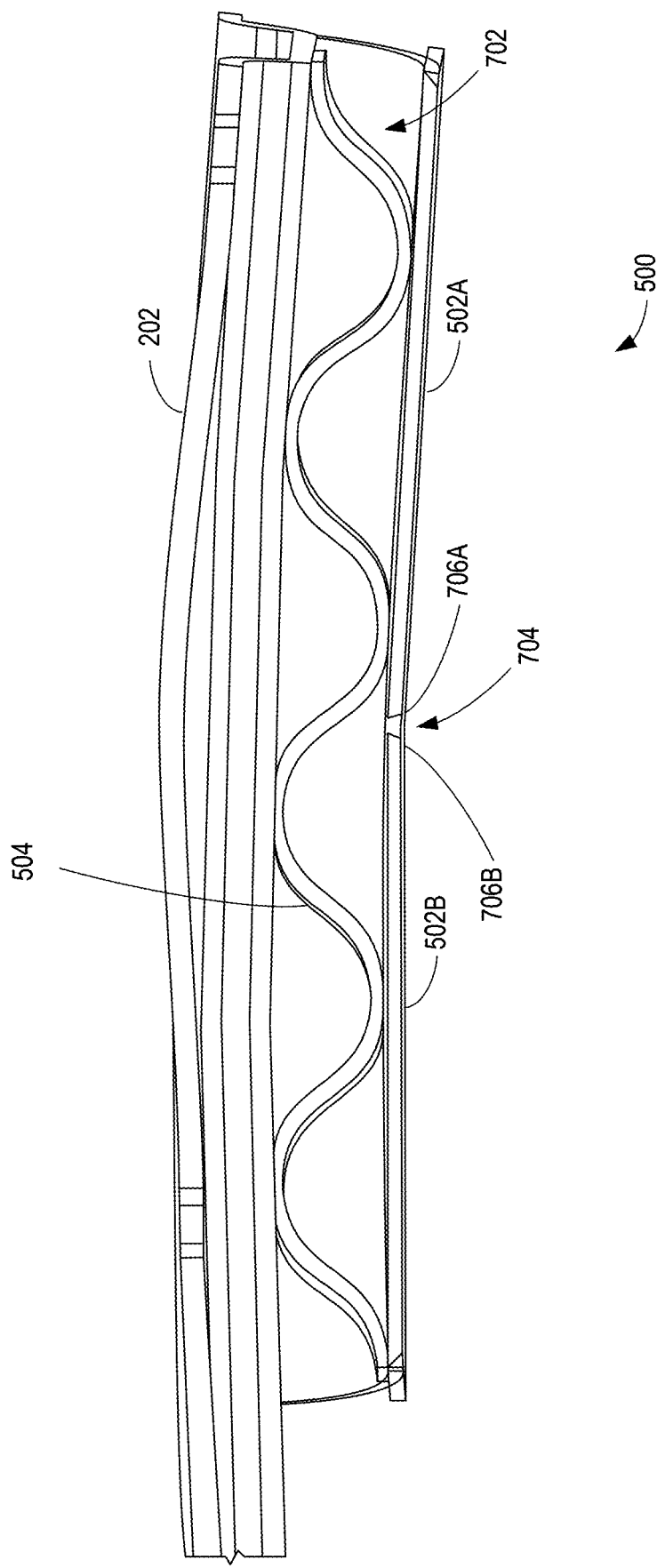
FIG. 7 is a front view of the second variable wall structure of FIG. 5.

FIG. 7 is a front view of the second variable wall structure 500 of FIGS. 5 and 6. In the illustrated example of FIG. 7, the member 504 includes a curvature 702. In the illustrated example of FIG. 7, the plates 502A, 502B include a gap 704 therebetween. In the illustrated examples of FIGS. 5-7, the member 504 is a corrugated sheet with curved corrugations. In other examples, the member 504 can have straight corrugations and/or bent corrugations. In the illustrated example of FIG. 7, the member 504 includes three and a half corrugations. In other examples, the member 504 can have any other suitable number of corrugations (e.g., two corrugations, five corrugations, ten corrugations, etc.). Additionally or alternatively, the member 504 can include any other suitable structure(s) that are permeable to the flow of air therethrough (e.g., a lattice, a strut, mesh, etc.). For example, the member 504 can be two or more struts that extend between the deflection plate 506 and the plates 502A, 502B. In the illustrated example of FIG. 7, the curvature 702 of the member 504 corresponds to the curvature 702 of the gas turbine engine 110.

In the illustrated example of FIG. 7, the plates 502A, 502B include a first side 706A and a second side 706B, respectively. In the illustrated example of FIG. 7, the sides 706A, 706B are spaced via the gap 704. In some examples, the gap 704 is dimensioned such that the sides 706A, 706B of the plates 502A, 502B abut (e.g., contact, engage, etc.) during high temperature and/or high strain engine conditions (e.g., a high-power engine condition, takeoff, the second ambient condition 408 of FIG. 4B, etc.). In some such examples, the sides 706A, 706B include a coating (e.g., a low-friction coating, etc.) to facilitate the contact of the sides 706A, 706B. In other examples, the gap 704 can be dimensioned such that the plates 502A, 502B remain spaced in all engine conditions. In some examples, the gap 704 is absent. In some such examples, the plates 502A, 502B are in contact in some or all engine conditions (e.g., the plates 502A, 502B are abutting in all engine conditions, etc.). In some such examples, the sides 706A, 706B are curved and/or include a joint to facilitate the abutment of the plates 502A, 502B.

Figure 8:
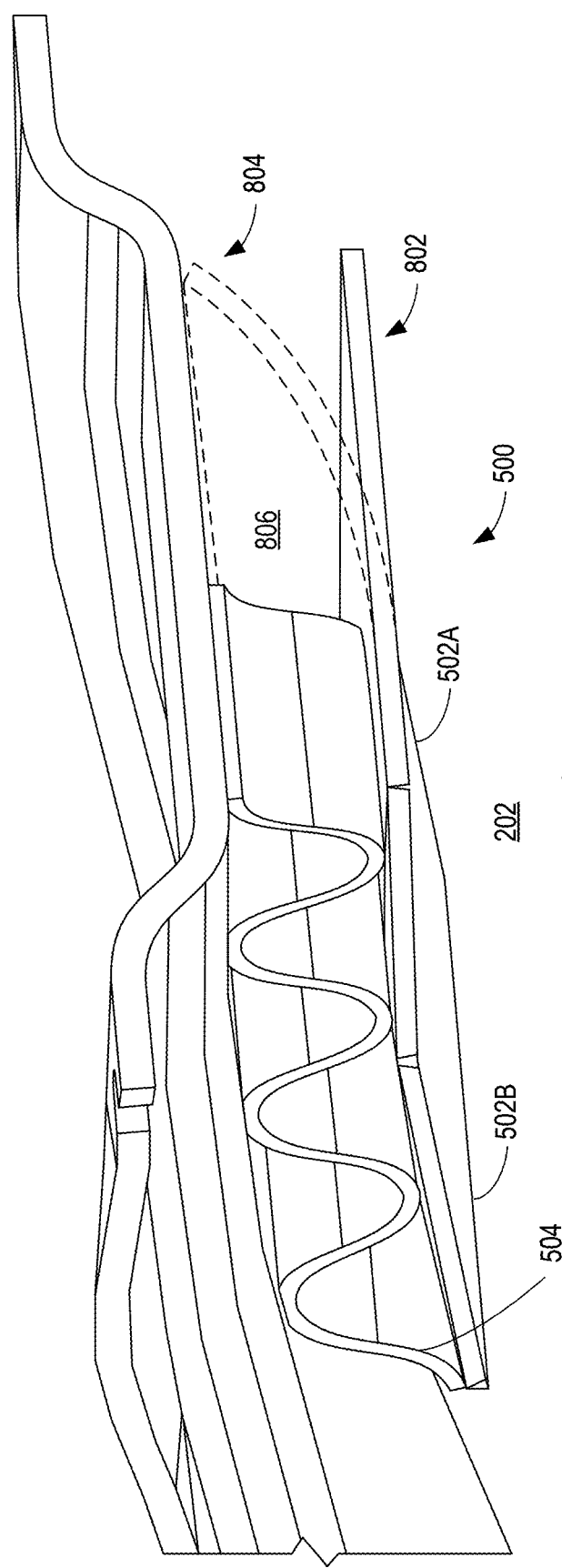
FIG. 8 is a perspective view of the second variable wall structure of FIG. 5.

FIG. 8 is a perspective view of the second variable wall structure 500 of FIGS. 5-7. In the illustrated example of FIG. 8, the second variable wall structure 500 has a first geometry 802 (represented in solid lines) and a second geometry 804 (represented in dashed lines). In some examples, the first geometry 802 corresponds to the position of the second variable wall structure 500 when the gas turbine engine 110 is in a high-power engine condition (e.g., the first ambient condition 402 of FIG. 4A, etc.). In some examples, the second geometry 804 corresponds to the position of the second variable wall structure 500 when the gas turbine engine 110 is in a high-power engine condition (e.g., the second ambient condition 408 of FIG. 4B, etc.). In the illustrated example of FIG. 8, the plates 502A, 502B are configured to have a same response to the ambient condition of the bleed slot. That is, the plates 502A, 502B have a first same curvature (e.g., flat, planar, not bent, etc.) when the second variable wall structure 500 has the first geometry 802 and a second same curvature (e.g., a same curvature profile, a same bend, etc.) when the second variable wall structure 500 has the second geometry 804. In the illustrated example of FIG. 8, to facilitate the same response (e.g., a same temperature sensitivity, a same temperature response, etc.), the plates 502A, 502B are composed of a same material, a same size, a same shape, and are coupled to the member 504 at the same relative position.

Like the first variable wall structure 300 of FIGS. 3-4B, the second variable wall structure 500 of FIGS. 5-8 increases the pressure recovery of the first bleed slot 202 during low-power engine conditions. That is, the curvature of the plates 502A, 502B in the second geometry 804 inhibits the recirculation of bleed flow in the first bleed flow path 208 via the creation of a blocked portion 806. The blocked portion 806 reduces the flow area of the bleed cavity 307 and inhibits (e.g., prevents, reduces, etc.) the flow of air through the first bleed slot 202 when the second variable wall structure 500 has the second geometry 804. When the gas turbine engine 110 is in a high-power engine condition, the second variable wall structure 500 has the first geometry 802, and the flow of bleed air through the first bleed slot 202 is not substantially affected by the plates 502A, 502B.

Figure 9:
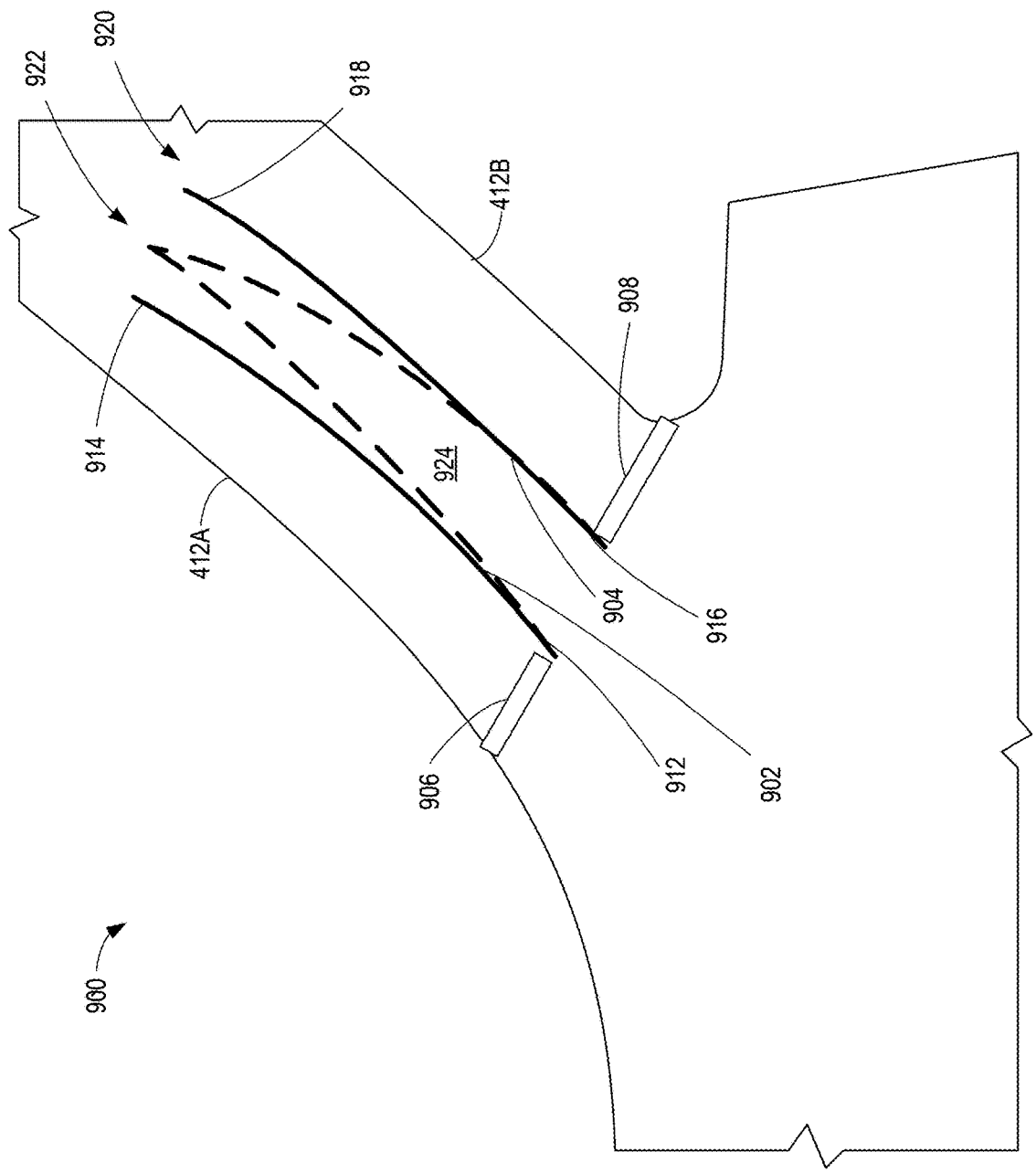
FIG. 9 is a schematic view of the bleed slot of FIG. 2 including an example third variable wall structure implemented in accordance with teachings of this disclosure.

FIG. 9 is a schematic view of the first bleed slot 202 of FIG. 2 including an example third variable wall structure 900 implemented in accordance with teachings of this disclosure. In the illustrated example of FIG. 9, the third variable wall structure 900 includes a first plate 902, a second plate 904, a first member 906, and a second member 908. The members 906, 908 are similar to the member 304 of FIGS. 3-4B, except that the first member 906 extends from the upstream wall 412A of the first bleed slot 202 and the second member 908 extends from the downstream wall 412B of the first bleed slot 202.

The plates 902, 904 are similar to the plate 302 of FIG. 3, except as noted otherwise herein. In the illustrated example of FIG. 9, the first plate 902 includes a first end 912 and a second end 914. In the illustrated example of FIG. 9, the first end 912 of the first plate 902 is fixedly coupled to the upstream wall 412A via the first member 906. In the illustrated example of FIG. 9, the second end 914 of the first plate 902 is suspended (e.g., cantilevered within the first bleed slot 202). In the illustrated example of FIG. 9, the second plate 904 includes a third end 916 and a fourth end 918. In the illustrated example of FIG. 9, the third end 916 of the second plate 904 is fixedly coupled to the downstream wall 412B via the second member 908. In the illustrated example of FIG. 9, the fourth end 918 of the second plate 904 is suspended (e.g., cantilevered, etc.) within the first bleed slot 202. In the illustrated example of FIG. 9, the plates 902, 904 do not include openings (e.g., perforations, openings similar to the openings 310 of FIG. 3, etc.). In other examples, one or both of the plates 902, 904 can include one or more openings to facilitate the flow of bleed flow therethrough.

In the illustrated example of FIG. 9, the third variable wall structure 900 has a first geometry 920 (represented via solid lines) and a second geometry 922 (represented via dashed lines). In some examples, the first geometry 920 corresponds to the position of the third variable wall structure 900 when the gas turbine engine 110 is in a high-power engine condition (e.g., the first ambient condition 402 of FIG. 4A, etc.), and the second geometry 922 the third variable wall structure 900 when the gas turbine engine 110 in a low power engine condition (e.g., the second ambient condition 408 of FIG. 4B, etc.).

In the second geometry 922, the second end 914 and the fourth end 918 converge to form a blocked region 924. The abutment of the ends 912, 914 inhibits (e.g., prevents, reduces, etc.) the flow of air through the blocked region 924 of the first bleed slot 202 when the third variable wall structure 900 has the second geometry 922. In other examples, in the second geometry 922, the ends 912, 914 do not abut and come into proximity (e.g., a small gap is formed between the ends 912, 914, etc.). In some such examples, the gap between the ends 912, 914 reduces but does not fully prevent the flow of air through the blocked region 924. In the second geometry 922, the plates 902, 904 are substantially parallel, and the plates 902, 904 and the ends 912, 914 are spaced (e.g., there is a comparatively large gap between the ends 912, 914, etc.). When the gas turbine engine 110 is in a high-power engine condition, the third variable wall structure 900 has the first geometry 920 and the flow of bleed air through the first bleed slot 202 is not substantially affected by the plates 902, 904.

FIG. 10 is a schematic view of the first bleed slot 202 of FIG. 2 including an example fourth variable wall structure 1000 implemented in accordance with teachings of this disclosure. In the illustrated example of FIG. 10, the fourth variable wall structure 1000 includes a first plate 1002, a second plate 1004, a third plate 1006, a first member 1008 and a second member 1010.

The plates 1002, 1004, 1006 are similar to the plate 302 of FIG. 3, except as noted otherwise herein. In the illustrated example of FIG. 10, the first plate 1002 includes a first end 1012 and a second end 1014. In the illustrated example of FIG. 10, the first end 1012 of the first plate 1002 is suspended in the first bleed slot 202 and the second end 1014 is coupled to the first member 1008. In the illustrated example of FIG. 10, the second plate 1004 includes a third end 1016 and a fourth end 1018. In the illustrated example of FIG. 10, the third end 1016 of the second plate 1004 is suspended in the first bleed slot 202 and the fourth end 1018 is coupled to the second member 1010. In the illustrated example of FIG. 10, the third plate 1006 includes a fifth end 1020 and a sixth end 1022. In the illustrated example of FIG. 10, the fifth end 1020 of the second plate 1004 is suspended in the first bleed slot 202 and the sixth end 1022 is coupled to the upstream wall 412A. In the illustrated example of FIG. 10, as the ambient temperature of the second bleed slot 202 decreases the ends 1012, 1016, 1020 deflect upstream relative to the main flow path 206.

In other examples, the plates 1002, 1004, 1006 of the fourth variable wall structure 1000 have other spatial relationship(s) within the first bleed slot 202. For example, the second end 1014 of the first plate 1002 can be coupled to the upstream wall 412A and the third plate 1006 can be disposed in the middle of bleed cavity 307 of the first bleed slot 202. In some such examples, as the ambient temperature of the first bleed slot 202 decreases the ends 1012, 1016, 1020 deflect upstream relative to the main flow path 206. In the illustrated example of FIG. 10, the plates 1002, 1004, 1006 do not include openings. In other examples, some or all of the plates 1002, 1004, 1006 can include one or more openings (e.g., perforations, openings similar to the openings 310 of FIG. 3, etc.) to facilitate the flow of bleed flow therethrough.

The members 1008, 1010 are similar to the member 304 of FIGS. 3-4B, except as noted otherwise herein. In the illustrated example of FIG. 10, the first member 1008 extends from the upstream wall 412A of FIG. 4A and the second member 1010 extends from a downstream wall 412B of FIG. 4A. In some examples, a third member (not illustrated) extends between the second end 1014 of the first plate 1002 and the fourth end 1018 of the second plate 1004. In some examples, the members 1008, 1010 can be implemented by one or more struts and/or other structural features that extend through some or all of the plates 1002, 1004, 1006.

In the illustrated example of FIG. 10, the fourth variable wall structure 1000 has a first geometry 1024 (represented via solid lines), a second geometry 1026 (represented via short, dashed lines), and a third geometry 1028 (represented via long dashed lines). In some examples, the first geometry 1024 corresponds to the position of the fourth variable wall structure 1000 when the gas turbine engine 110 is in a high-power engine condition (e.g., the first ambient condition 402 of FIG. 4A, etc.). In some examples, the second geometry 1026 corresponds to a position of the gas turbine engine 110 in a medium power condition (e.g., descent, etc.). In some examples, the third geometry 1028 corresponds to the position of the gas turbine engine 110 in a low-power engine condition (e.g., the second ambient condition 408 of FIG. 4B, etc.). In the illustrated example of FIG. 10, the second geometry 1026 represents a position between the first geometry 1024 and the third geometry 1028. That is, the fourth variable wall structure 1000 moves through the second geometry 1026 to move from the first geometry 1024 to the third geometry 1028 or to move from the third geometry 1028 to the first geometry 1024. It should be appreciated the fourth variable wall structure 1000 translates gradually between the geometries 1024, 1026, 1028, and in some examples, the fourth variable wall structure 1000 can occupy intermediate positions between the geometries 1024, 1026, 1028.

In the first geometry 1024, the first plate 1002 has a first curvature 1030, the second plate 1004 has a second curvature 1032, and the third plate 1006 has a third curvature 1034. In the illustrated example of FIG. 10, the curvatures 1030, 1032, 1034 are complementary to the curvature of the bleed cavity 307 (e.g., some or all of the curvatures 1030, 1032, 1034 of the plates 1002, 1004, 1006 are parallel to the curvature of the interior of the first bleed slot 202, etc.). In the illustrated example of FIG. 10, in the third curvature 1034, the third plate 1006 to abut the downstream wall 412B along the length of the third plate 1006. In other examples, the curvatures 1030, 1032, 1034 are approximately planar curvatures (e.g., the plates 1002, 1004, 1006 are flat in the first geometry 1024, the plates 1002, 1004, 1006 are approximately planar in the first geometry 1024, etc.). Additionally or alternatively, the curvatures 1030, 1032, 1034 are the same (e.g., planar, etc.). In other examples, some or all of the curvatures 1030, 1032, 1034 are different and/or non-planar. In the illustrated example of FIG. 10, in the first geometry 1024, the curvatures 1030, 1032, 1034 of the plates 1002, 1004, 1006 do not substantially inhibit the flow of air through the first bleed flow path 208. As used herein, the first geometry 1024 is also referred to herein as a "fully open geometry, an "open geometry," and "an open position" of the fourth variable wall structure 1000.

In the second geometry 1026, the first plate 1002 has a fourth curvature 1036, the second plate 1004 has a fifth curvature 1038, and the third plate 1006 has a sixth curvature 1040. In the illustrated example of FIG. 10, in the fourth curvature 1036, the first end 1012 of the first plate 1002 is deflected toward the upstream wall 412A of the first bleed slot 202. In the illustrated example of FIG. 10, in the fifth curvature 1038, the third end 1016 of the second plate 1004 is deflected toward the upstream wall 412A of the first bleed slot 202 and the first plate 1002. In the illustrated example of FIG. 10, in the sixth curvature 1040, the fifth end 1020 of the third plate 1006 is deflected toward the upstream wall 412A of the first bleed slot 202 and the plates 1004, 1006. In the illustrated example of FIG. 10, the abutment of the plates 1002, 1004, 1006 inhibits (e.g., partially inhibits, fully inhibits, etc.) the flow of air along the first bleed flow path 208. In some examples, in the second geometry 1026, the curvatures 1036, 1038, 1040 of the plates 1002, 1004, 1006 reduce the flow area of the first bleed flow path 208, which can reduce recirculation and/or other aero effects that reduce the pressure recovery of the first bleed slot 202. As used herein, the second geometry 1026 is also referred to herein as a "partially closed geometry" and "a partially closed position."

In the third geometry 1028, the first plate 1002 has a seventh curvature 1042, the second plate 1004 has an eighth curvature 1044, and the third plate 1006 has a ninth curvature 1046. In the illustrated example of FIG. 10, in the seventh curvature 1042, the first end 1012 of the first plate 1002 abuts the upstream wall 412A of the first bleed slot 204. In the illustrated example of FIG. 10, in the eighth curvature 1044, the third end of the second plate 1004 abuts the first plate 1002. In the illustrated example of FIG. 10, in the ninth curvature 1046, the fifth end 1020 of the third plate 1006 abuts the second plate 1004. In the illustrated example of FIG. 10, the abutment of the plates 1002, 1004, 1006 inhibits (e.g., partially inhibits, fully inhibits, etc.) the flow of air along the first bleed flow path 208. In some examples, depending on a presence of openings of the plates 1002, 1004, 1006 and/or a shape of the plates 1002, 1004, 1006, in the third geometry 1028, the fourth variable wall structure 1000 prevents the flow of air through the first bleed flow path 208. In some examples, in the third geometry 1028, the abutment of the plates 1002, 1004, 1006 mitigates (e.g., reduces, prevents, etc.) recirculation and other aero effects that reduce the pressure recovery of the first bleed slot 202. As used herein, the third geometry 1028 is also referred to herein as a "fully closed geometry," a "closed geometry," and "a closed position."

FIG. 11A is a schematic view of the first bleed slot 202 of FIG. 2 and an example fifth variable wall structure 1100 implemented in accordance with teachings of this disclosure. In the illustrated example of FIG. 11A, the fifth variable wall structure 1100 includes the member 304 of FIG. 3, a first plate 1102, a second plate 1104, and a biasing member 1106. In the illustrated example of FIG. 11A, the fifth variable wall structure 1100 is in a first geometry 1108, which corresponds to the position of the fifth variable wall structure 1100 when the gas turbine engine 110 has the first ambient condition 402 of FIG. 4A (e.g., a high-power engine condition, etc.). In the illustrated example of FIG. 11A, the first plate 1102 has a first end 1110 and a second end 1112. In the illustrated example of FIG. 11A, the second plate 1104 has a third end 1114 and a fourth end 1116. In the illustrated example of FIG. 11A, the member 304 extends from the upstream wall 412A. In other examples, the member 304 extends from the downstream wall 412B.

The plates 1102, 1104 are variable geometry structures that are disposed in the bleed cavity 307 of the first bleed slot 202. In the illustrated example of FIG. 11A, the first end 1110 of the first plate 1102 and the third end 1114 of the second plate 1104 are coupled to the member 304 such that the second end 1112 of the first plate 1102 and the fourth end 1116 of the second plate 1104 are cantilevered (e.g., suspended, etc.) within the bleed cavity 307. In the illustrated example of FIG. 11A, the first end 1110 of the first plate 1102 and the third end 1114 of the second plate 1104 are coupled via a joint 1120 (e.g., a hinge, etc.). The joint 1120 enables the plates 1102, 1104 to rotate about the joint 1120 (e.g., the first plate 1102 rotates about the first end 1110, the second plate 1104 rotates about the third end 1114, etc.), such that the distance between the second end 1112 and the fourth end 1116 can vary (e.g., depending on the ambient condition of the bleed cavity 307, etc.). In the illustrated example of FIG. 11A, the plates 1102, 1104 are approximately equally spaced between the upstream wall 412A and the downstream wall 412B. In other examples, the plates 1102, 1104 can be disposed at another location in the bleed cavity 307 (e.g., closer to the upstream wall 412A, etc.).

In the illustrated example of FIG. 11A, the plates 1102, 1104 include a first plurality of openings 1118A and a second plurality of openings 1118B, respectively. The openings 1118A, 1118B are perforations, openings, gaps, etc. in the plates 1102, 1104 that enable the flow of air therethrough. In the illustrated example of FIG. 11A, the openings 1118A, 1118B have a uniform pattern (e.g., a grid pattern, etc.). In other examples, the openings 1118A, 1118B are disposed in a non-uniform arraignment (e.g., a random arrangement, etc.). In some examples, the openings 1118A, 1118B damp (e.g., dampen, etc.) the acoustic effects associated with the flow of air over the plates 1102, 1104, respectively. In the illustrated example of FIG. 11A, the openings 1118A, 1118B can have any suitable geometry (e.g., circles, polygons, slots, ovoid, irregular, etc.). In other examples, some or all of the openings 1118A, 1118B are absent. In some such examples, one or both of the plates 1102, 1104 are solid. In the illustrated example of FIG. 11A, ones of the first plurality of openings 1118A are aligned with corresponding ones of the second plurality of openings 1118B.

In the illustrated example of FIG. 11A, the second end 1112 and the fourth end 1116 are coupled via the biasing member 1106. As used herein, "a biasing member" is a mechanical structure that exerts a biasing force on another structure. The biasing member 1106 biases the plates 1102, 1104 toward the upstream wall 412A and the downstream wall 412B, respectively. That is, the biasing member 1106 exerts a biasing force on the plates 1102, 1104. For example, the biasing member 1106 can be implemented by a spring (e.g., a flat spring, a leaf spring, an air spring, a coil spring, a disc spring, etc.). In some such examples, the biasing force of the biasing member 1106 is resisted by the ambient pressure of within the bleed cavity 307. For example, as the pressure in the bleed cavity 307 increases, the pressure acting on the plates 1102, 1104 biases the ends 1112, 1116 together, which is opposed by the biasing force of the biasing member 1106. In high-pressure conditions, such as the first ambient condition 402, the comparatively greater pressure of the flow of the first bleed flow path 208 overcomes the biasing force of the biasing member 1106 and causes the plates 1102, 1104 to have the first geometry 1108 of FIG. 11A. In the illustrated example of FIG. 11A, the biasing member 1106 is V-shaped. In other examples, the biasing member 1106 can have a different shape (e.g., C-shaped, U-shaped, coil-shaped, etc.).

Additionally or alternatively, the biasing member 1106 can have a variable geometry based on the ambient temperature within the bleed cavity 307. For example, the biasing member 1106 can be composed of a smart metal alloy (SMA). In some such examples, the biasing member 1106 can be composed of any suitable SMA (e.g., a copper-aluminum-nickel alloy, a nickel-titanium alloy, an iron-magnesium-tin alloy, a copper-zinc-aluminum alloy, a copper-aluminum-nickel alloy, etc.). In such examples, as the biasing member 1106 is heated (e.g., during hotter engine conditions such as takeoff, etc.), the SMA can be configured to bend into a retracted position (e.g., the position depicted in FIG. 11A, etc.). In some such examples, the rigid coupling of the ends 1112, 1116 to the biasing member 1106 causes the fifth variable wall structure 1100 into the first geometry 1108 of FIG. 11A.

Additionally or alternatively, the biasing member 1106 can be composed of multiple layers of material. For example, the biasing member 1106 can be composed of two layers of different metals (e.g., a bimetallic construction, etc.) that are rigidly coupled and have different coefficients of thermal expansion. For example, the biasing member 1106 can include a first layer composed of an aluminum, a titanium, a steel, a nickel alloy, and/or another metal and a second layer composed of a different metal (e.g., a different titanium, a different aluminum, a different nickel alloy, a different steel, etc.). As the biasing member 1106 is heated, the materials of the biasing member 1106 expand at different rates, which causes the biasing member 1106 to flex. In some such examples, the rigid coupling of the ends 1112, 1116 to the biasing member 1106 causes the fifth variable wall structure 1100 into the first geometry 1108 of FIG. 11A.

In the illustrated example of FIG. 11A, in the first geometry 1108, the plates 1102, 1104 are substantially parallel and the ends 1112, 1116 are adjacent (e.g., the ends 1112, 1116 abut, there is a small gap between the ends 1112, 1116, etc.). In some examples, the plates 1102, 1104 abut along the length of the plates 1102, 1104. In the illustrated example of FIG. 4A, the first geometry 1108 of the fifth variable wall structure 1100 does not substantially inhibit the flow of air through the first bleed flow path 208. That is, the plates 1102, 1104 of the fifth variable wall structure 1100 do not substantially inhibit the flow of air through the first bleed slot 202 in the first ambient condition 402.

FIG. 11B is a schematic view of the first bleed slot 202 of FIG. 2 and the fifth variable wall structure 1100 of FIG. 11A-11B. In the illustrated example of FIG. 11B, the fifth variable wall structure 1100 is in a second geometry 1122, which corresponds to the position of the fifth variable wall structure 1100 when the gas turbine engine 110 is in the second ambient condition 408 of FIG. 4B (e.g., a low-power engine condition, etc.). For example, if the biasing member 1106 is temperature sensitive (e.g., the biasing member 1106 is composed of SMA, the biasing member 1106 is bimetallic, etc.), the comparatively low temperature of the second ambient condition 408 compared to the first ambient condition 402 causes the biasing member 1106 to expand and displace the ends 1112, 1116 toward the walls 412A, 412B, respectively. Additionally or alternatively, if the biasing member 1106 is pressure sensitive (e.g., the biasing member 1106 is a spring, etc.), the comparatively low pressure of the second ambient condition 408 compared to the first ambient condition 402 causes the spring force of the biasing member 1106 to displace the ends 1112, 1116 toward the walls 412A, 412B, respectively.

In the illustrated example of FIG. 11B, the expansion of the biasing member 1106 causes the plates 1102, 1104 to rotate about joint 1120 and form a blocked region 1124. In the illustrated example of FIG. 11A, the blocked region 1124 is centered in the bleed cavity 307. In other examples, depending on the location of the fifth variable wall structure 1100, the blocked region 1124 can be in another location in the bleed cavity 307 (e.g., adjacent to the upstream wall 412A, etc.). In the illustrated example of FIG. 11B, in the second geometry 1122, the second end 1112 is displaced away from the fourth end 1116. The blocked region 1124 reduces the flow area through the first bleed flow path 208. Like the first variable wall structure 300 of FIGS. 3-4B, the fifth variable wall structure 1100 of FIGS. 11A-11B increases the pressure recovery of the first bleed slot 202 during low-power engine conditions. That is, the expansion of the biasing member 1106 and the rotation of the plates 1102, 1104 in the second geometry 1122 inhibits the recirculation of bleed flow in the first bleed flow path 208 via the creation of the blocked region 1124.

Figure 12:
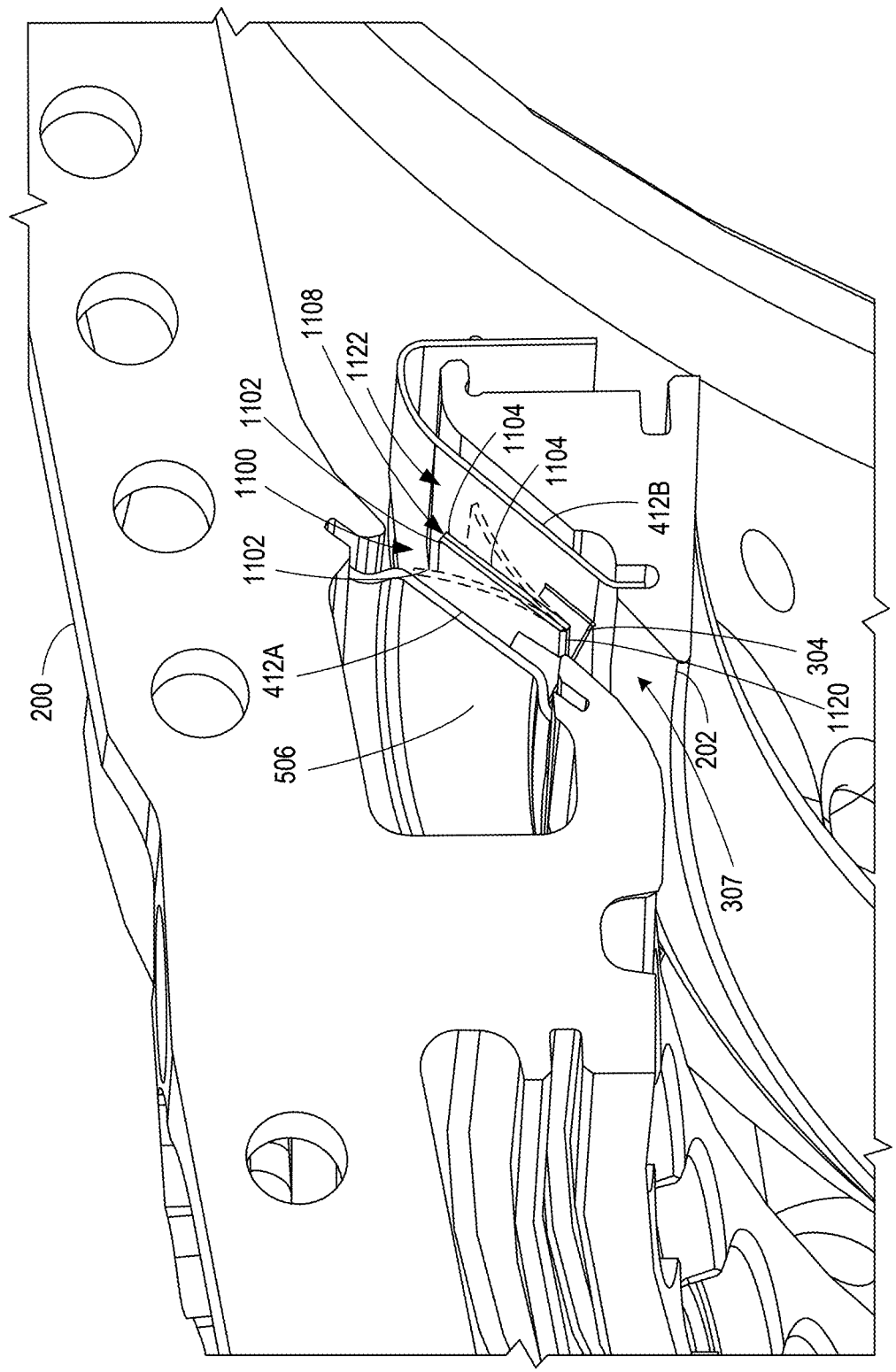
FIG. 12 is a perspective view of the bleed slot and fifth variable bleed structure of FIGS. 11A and 11B.

FIG. 12 is a perspective view of the fifth variable wall structure 1100 of FIG. 11A disposed in the compressor casing 200 of FIG. 2. In the illustrated example of FIG. 12, the compressor casing 200 includes the first bleed slot 202 of FIG. 2, the bleed cavity 307 of FIG. 3, the walls 412A, 412B of FIGS. 4A and 4B, and the deflection plate 506 of FIG. 5. In the illustrated example of FIG. 12, the fifth variable wall structure 1100 includes the plates 1102, 1104 of FIGS. 11A and 11B, the member 304 of FIGS. 3, 11A, and 11B, and the joint 1120 of FIGS. 11A and 11B. In the illustrated example of FIG. 12, the fifth variable wall structure 1100 has the first geometry 1108 of FIG. 11A (represented in solid lines) and the second geometry 1122 of FIG. 11B. (represented in dashed lines).

In the illustrated example of FIG. 12, the member 304 is a strut that extends between the upstream wall 412A and the downstream wall 412B. In other examples, the member 304 extends from only the upstream wall 412A or only the downstream wall 412B. In the illustrated example of FIG. 12, the joint 1120 is formed in the member 304. In some such examples, the member 304 can include a notch and/or other opening to facilitate the rotation of the plates 1102, 1104 about the joint 1120 (e.g., the expansion of the joint 1120, etc.). In the illustrated example of FIG. 12, the upstream wall 412A of the first bleed slot 202 is the deflection plate 506 of FIG. 5. In other examples, the deflection plate 506 is absent and the upstream wall 412A is formed by a portion of the compressor casing 200. In the illustrated example of FIG. 12, the member 304 is coupled to both of the plates 1102, 1104. In other examples, the member 304 can be implemented by any other suitable structure that enables flow through the first bleed slot 202 to pass through the member 304 (e.g., a lattice, a corrugated sheet, etc.).

In the illustrated example of FIG. 12, the biasing member 1106 is absent. In the illustrated example of FIG. 12, the plates 1102, 1104 can be composed of a temperature-sensitive material (e.g., SMA, a bimetallic layer, etc.). In some such examples, as the temperature of the bleed cavity 307 changes (e.g., from the first ambient condition 402 of FIGS. 4A and 11A to the second ambient condition 408 of FIGS. 4B and 11B, etc.), the material of the plates 1102, 1104 can cause the plates 1102, 1104 to be bend and the fifth variable wall structure 1100 to assume a corresponding one of the geometries 1108, 1122. That is, the material composition of the plates 1102, 1104 causes the plates 1102, 1104 to rotate about the joint 1120 and the fifth variable wall structure 1100 to assume different geometries (e.g., the geometries 1108, 1122, geometries between the first geometry 1108 and the second geometry 1122, etc.) based on the ambient temperature of the first bleed slot 202 (e.g., the first ambient condition 402, the second ambient condition 408, ambient conditions with temperatures between the first ambient condition 402 and the second ambient condition 408, etc.). In other examples, the biasing member 1106 is disposed between the plates 1102, 1104.

Figure 13:
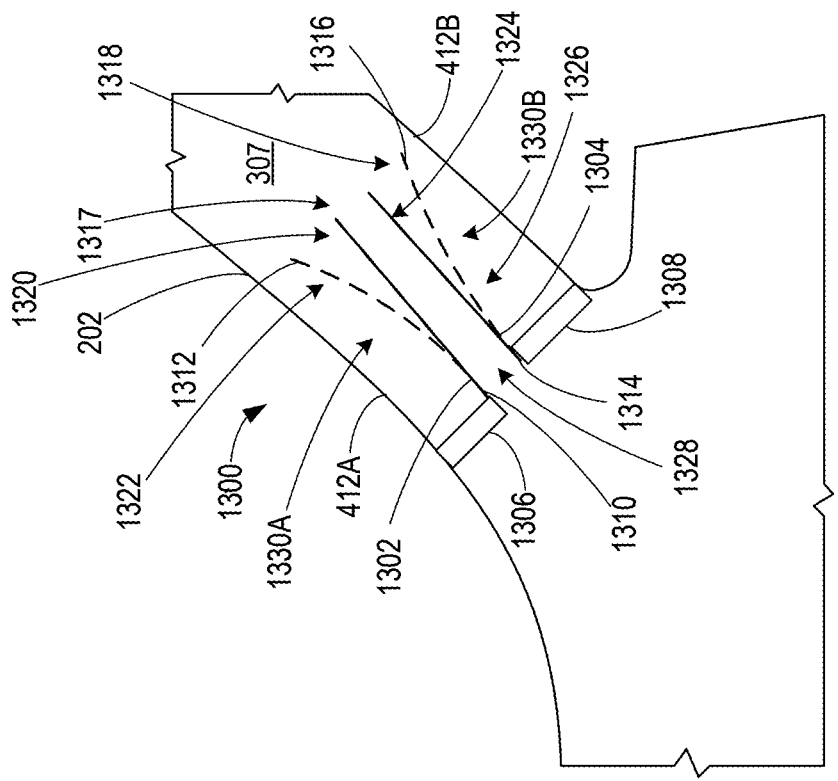
FIG. 13 is a schematic view of the bleed slot of FIG. 2 and an example sixth variable wall structure implemented in accordance with teachings of this disclosure.

FIG. 13 is a schematic view of the first bleed slot 202 of FIG. 2 and an example sixth variable wall structure 1300 implemented in accordance with teachings of this disclosure. In the illustrated example of FIG. 13, the sixth variable wall structure 1300 includes a first plate 1302, a second plate 1304, a first member 1306, and a second member 1308. In the illustrated example of FIG. 13, the first plate 1302 has a first end 1310 and a second end 1312. In the illustrated example of FIG. 13, the first end 1310 of the first plate 1302 is coupled to the first member 1306 and the second end 1312 of the second plate 1304 is suspended in the bleed cavity 307. In the illustrated example of FIG. 13, the second plate 1304 has a third end 1314 and a fourth end 1316.

In the illustrated example of FIG. 13, the third end 1314 is coupled to the second member 1308 and the fourth end 1316 is suspended in the bleed cavity 307. In the illustrated example of FIG. 13, the compressor casing 200 includes the first bleed slot 202 of FIG. 2, the bleed cavity 307 of FIG.

3, and the walls 412A, 412B of FIGS. 4A and 4B. The members 1306, 1308 are similar to the member 304 of FIG. 3, except that (1) the first member 1306 extends from the upstream wall 412A to the first plate 1302, (2) the second member 1308 extends from the downstream wall 412B to the second plate 1304, and (3) as otherwise noted.

In the illustrated example of FIG. 13, the sixth variable wall structure 1300 has a first geometry 1317 (represented in solid lines) and a second geometry 1318 (represented in dashed lines). In some examples, the first geometry 1317 corresponds to the position of the sixth variable wall structure 1300 when the gas turbine engine 110 has a high power engine condition (e.g., the first ambient condition 402 of FIG. 4A, etc.) and the second geometry 1318 of the sixth variable wall structure 1300 when the gas turbine engine 110 in a high power engine condition (e.g., the second ambient condition 408 of FIG. 4B, etc.).

In the illustrated example of FIG. 13, the plates 1302, 1304 are variable geometry structures that are disposed in the bleed cavity 307 of FIG. 3. The plates 1302, 1304 are similar to the plate 302 of FIGS. 3, 4A, and 4B, except as noted otherwise herein. For example, the plates 1302, 1304 can be composed of SMA or two or more layered metals. In the illustrated example of FIG. 13, the first plate 1302 has a first curvature 1320 in the first geometry 1317 and a second curvature 1322 in the second geometry 1318. In the illustrated example of FIG. 13, the second plate 1304 has a third curvature 1324 in the first geometry 1317 and a fourth curvature 1326 in the second geometry 1318. In the first geometry 1317 and with the curvatures 1320, 1324, the plates 1302, 1304 are approximately planar (e.g., the ends 1310, 1312 of the first plate 1302 are coplanar, the ends 1314, 1316 of the second plate 1304 are coplanar, etc.). In the second geometry 1318 and with the curvatures 1322, 1326, the plates 1302, 1304 are non-planar (e.g., the ends 1310, 1312 of the first plate 1302 are not coplanar, the ends 1314, 1316 of the second plate 1304 are not coplanar, etc.).

In the illustrated example of FIG. 13, the plates 1302, 1304 define a channel 1328 therebetween in the bleed cavity 307. In the illustrated example of FIG. 13, the plates 1302, 1304 are parallel in the first geometry 1317 (e.g. the first end 1310 is spaced from the third end 1314 a same amount as that the second end 1312 is spaced from the fourth end 1316, the channel 1328 has an even spacing along the plates 1302, 1304, etc.). In other examples, the plates 1302, 1304 converge along the first bleed flow path 208 (e.g., the channel 1328 expands along the first bleed flow path 208, etc.) and/or diverge along the first bleed flow path 208 (e.g., the channel 1328 retracts along the first bleed flow path 208, etc.). In the first geometry 1317 (e.g., during high power engine conditions, etc.), air is able to flow through the channel 1328 (e.g., between the plates 1302, 1304, etc.), between the first plate 1302 and the upstream wall 412A, and the between the second plate 1304 and the downstream wall 412B. In the illustrated example of FIG. 13, in the first geometry 1317, the sixth variable wall structure 1300 does not inhibit the flow of air through the first bleed slot 202 in the first ambient condition 402.

In the second geometry 1318, the plates 1302, 1304 assume the second curvature 1322 and the fourth curvature 1326, respectively, in response to the temperature decrease of the bleed cavity 307 (e.g., during low power engine conditions, during the second ambient condition 408 of FIG. 4B, etc.). The second curvature 1322 of the first plate 1302 causes the second end 1312 to deflect toward the upstream wall 412A and form a first blocked region 1330A. The fourth curvature 1326 of the second plate 1304 causes the fourth end 1316 to deflect toward downstream wall 412B and form a second blocked region 1330B. In the illustrated example of FIG. 13, the second end 1312 and the fourth end 1316 are spaced from walls 412A, 412B, respectively, such that some air is able to pass through the blocked regions 1330A, 1330B (e.g., the blocked regions 1330A, 1330B are partially blocked regions, etc.). In other examples, one or both of the ends 1312, 1316 of the plates 1302, 1304 abut (e.g., contact, nearly abut, etc.) corresponding ones of the walls 412A, 412B. In some such examples, flow is unable to pass through the blocked regions 1330A, 1330B and only flows through the channel 1328. In the second geometry 1318, the plates 1302, 1304 mitigate (e.g., reduce, prevent, etc.) recirculation (e.g., eddies, vortexes, whirlpools, etc.) and/or other turbulent effects in the blocked regions 1330A, 1330B associated with the turning of air from the main flow path 206 to the first bleed flow path 208. In some examples, the reduction in recirculation and other turbulent effects increases the pressure recovery of the first bleed slot 202. As such, the sixth variable wall structure 1300 of FIG. 13 increases the pressure of bleed air extracted from the first bleed slot 202 and the usefulness of the extracted bleed air.

Figure 14:
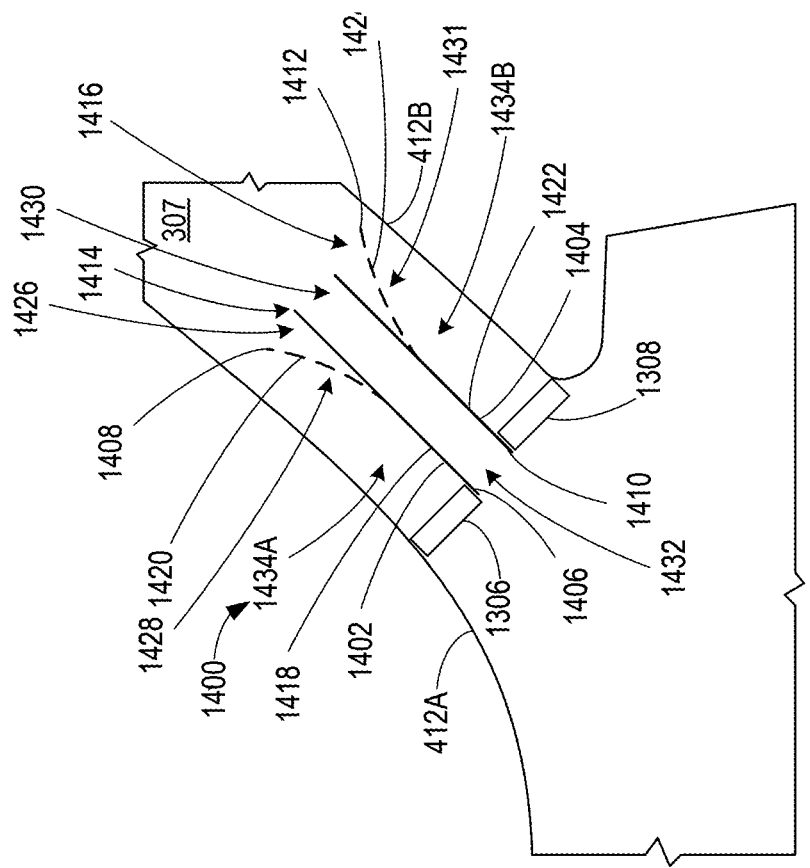
FIG. 14 is a schematic view of the bleed slot of FIG. 2 and an example seventh variable wall structure implemented in accordance with teachings of this disclosure.

FIG. 14 is a schematic view of the first bleed slot 202 of FIG. 2 and a seventh variable wall structure 1400 implemented in accordance with teachings of this disclosure. In the illustrated example of FIG. 14, the seventh variable wall structure 1400 includes a first plate 1402, a second plate 1404, the first member 1306 of FIG. 13, and the second member 1308 of FIG. 13. In the illustrated example of FIG. 14, the first plate 1402 has a first end 1406 and a second end 1408. In the illustrated example of FIG. 14, the first end 1406 of the first plate 1402 is coupled to the first member 1306 and the second end 1408 of the first plate 1402 is suspended in the bleed cavity 307. In the illustrated example of FIG. 14, the second plate 1404 has a third end 1410 and a fourth end 1412. In the illustrated example of FIG. 14, the third end 1410 of the second plate 1404 is coupled to the second member 1308, and the fourth end 1412 of the second plate 1404 is suspended in the bleed cavity 307. In the illustrated example of FIG. 13, the compressor casing 200 includes the first bleed slot 202 of FIG. 2, the bleed cavity 307 of FIG. 3, and the walls 412A, 412B of FIGS. 4A and 4B.

In the illustrated example of FIG. 14, the seventh variable wall structure 1400 has a first geometry 1414 (represented in solid lines) and a second geometry 1416 (represented in dashed lines). In some examples, the first geometry 1414 corresponds to the position of the seventh variable wall structure 1400 when the gas turbine engine 110 in a high-power engine condition (e.g., the first ambient condition 402 of FIG. 4A, etc.) and the second geometry 1416 of the seventh variable wall structure 1400 when the gas turbine engine 110 in a high power engine condition (e.g., the second ambient condition 408 of FIG. 4B, etc.).

In the illustrated example of FIG. 14, the plates 1402, 1404 are variable geometry structures that is disposed in the bleed cavity 307 of FIG. 3. The plates 1302, 1304 are similar to the plate 302 of FIGS. 3, 4A, and 4B, except as noted otherwise herein. In the illustrated example of FIG. 14, the first plate 1402 includes a first plate portion 1418 and a second plate portion 1420. In the illustrated example of FIG. 14, the second plate 1404 includes a third plate portion 1422 and a fourth plate portion 1424. In the illustrated example of FIG. 14, the first plate 1402 has a first curvature 1426 in the first geometry 1414 and a second curvature 1428 in the second geometry 1416. In the illustrated example of FIG. 14, the second plate 1404 has a third curvature 1430 in the first geometry 1414 and a fourth curvature 1431 in the second geometry 1416.

In the illustrated example of FIG. 14, in the first geometry 1414 and the first curvature 1426, the first plate portion 1418 and the second plate portion 1420 are approximately coplanar (e.g., the first plate 1402 is planar in the first geometry 1414, the ends 1406, 1408 are coplanar, etc.). In the illustrated example of FIG. 14, in the first geometry 1414 and the second curvature 1428, the third plate portion 1422 and the fourth plate portion 1424 are approximately coplanar (e.g., the second plate 1404 is planar in the second geometry, the ends 1410, 1412, etc.). In the illustrated example of FIG. 14, in the second geometry 1416 and the second curvature 1428, the first plate portion 1418 is approximately planar and the second plate portion 1420 bends such that the second end 1408 is deflected toward the upstream wall 412A. In the illustrated example of FIG. 14, in the second geometry 1416 and the fourth curvature 1431, the third plate portion 1422 is approximately planar and the fourth plate portion 1424 bends such that the fourth end 1412 is deflected toward the downstream wall 412B.

In the illustrated example of FIG. 14, the first plate portion 1418 of the first plate 1402 and the third plate portion 1422 of the second plate 1404 are approximately planar and/or static in both the first geometry 1414 and the second geometry 1416. That is, the plate portions 1418, 1422 are not variable and/or sensitive to the ambient condition of the bleed cavity 307. In the illustrated example of FIG. 14, the second plate portion 1420 of the first plate 1402 and the fourth plate portion 1424 of the second plate 1404 bend (e.g., move, deflect, etc.) in response to temperature changes in the bleed cavity 307. In some examples, to facilitate the movement of the plate portions 1420, 1424 and the non-movement of the plate portions 1418, 1422, the first plate portion 1418 and the third plate portion 1422 are thicker than the second plate portion 1420 and the fourth plate portion 1424. Additionally or alternatively, the first member 1306 and/or the second member 1308 can extend along the lengths of the first plate portion 1418 and the third plate portion 1422, respectively, to prevent the deflection of the plate portions 1418, 1420. Additionally or alternatively, the first plate portion 1418 and the third plate portion 1422 can be composed of a non-temperature sensitive material and the second plate portion 1420 and the fourth plate portion 1424 can be composed of a temperature-sensitive material (e.g., SMA, a bimetallic material, etc.). In other examples, the plates 1402, 1404 can be entirely composed of a temperature-sensitive material.

In the illustrated example of FIG. 14, the first plate portion 1418 and the third plate portion 1422 define a channel 1432 therebetween in the bleed cavity 307 of FIG. 3. In the illustrated example of FIG. 14, in the first geometry 1414, the channel 1432 extends along the length of the plates 1402, 1404 (e.g., the channel 1432 extends to between the second plate portion 1420 and the fourth plate portion 1424, etc.). In the first geometry 1414 (e.g., during high power engine conditions, during the first etc.), air is able to flow through the channel 1432 (e.g., between the plates 1402, 1404, etc.), between the first plate 1402 and the upstream wall 412A, and the between the second plate 1404 and the downstream wall 412B. In the illustrated example of FIG. 14, in the first geometry 1414, the curvatures 1426, 1431 of the plates 1402, 1404, respectively, of the seventh variable wall structure 1400 do not inhibit the flow of air through the first bleed slot 202 in the first ambient condition 402.

In the second geometry 1416, the plates 1402, 1404 assume the second curvature 1428 and the fourth curvature 1431, respectively, in response to the temperature decrease of the bleed cavity 307 (e.g., during low power engine conditions, during the second ambient condition 408 of FIG. 4B, etc.). The second curvature 1428 of the first plate 1402 causes the second end 1408 to deflect toward the upstream wall 412A to form a first blocked region 1434A. The fourth curvature 1431 of the second plate 1404 causes the fourth end 1412 to deflect toward downstream wall 412B to form a second blocked region 1434B. In the illustrated example of FIG. 14, the second end 1408 and the fourth end 1412 are spaced from walls 412A, 412B, respectively, such that some air is able to pass through the blocked regions 1434A, 1434B (e.g., the blocked regions 1434A, 1434B are partially blocked regions, etc.). In other examples, one or both of the ends 1408, 1412 of the plates 1402, 1404 can abut (e.g., contact, nearly abut, etc.) corresponding ones of the walls 412A, 412B. In some such examples, flow is unable to pass through the blocked regions 1434A, 1434B and only flows through the channel 1432. In the second geometry 1416, the plates 1402, 1404 reduce recirculation (e.g., eddies, vortexes, whirlpools, etc.) and/or other turbulent effects in the blocked regions 1434A, 1434B associated with the turning of air from the main flow path 206 to the first bleed flow path 208. In some examples, the reduction in recirculation and other turbulent effects increases the pressure recovery of the first bleed slot 202. As such, the seventh variable wall structure 1400 of FIG. 14 increases the pressure of bleed air extracted from the first bleed slot 202 and the usefulness of the extracted bleed air.

Example variable wall structures for use within compressor bleed slots are disclosed herein. Example variable wall structures disclosed herein are moveable between different positions based on the condition of the engine. Examples disclosed herein reduce recirculation and other turbulent flow effects in bleed slots during low power engine conditions. The reduction of recirculation effects reduces pressures losses within compressor bleed slots, which increases the pressure and energy of extracted bleed air. The increased pressure and energy of extracted bleed air increases the usefulness (e.g., amount of work that can be extracted, etc.) from the extracted bleed air.

Further aspects of the present disclosure are provided by the subject matter of the following clauses:

An apparatus to be coupled to a wall of a bleed slot of a compressor of a gas turbine engine, the bleed slot defining a flow path, the apparatus comprising a member to be coupled to the wall, and a plate coupled to the member, the plate having a first geometry at a first ambient condition at a first time, the flow path having a first area when the plate has the first geometry, and a second geometry at a second ambient condition at a second time, the flow path having a second area when the plate has the second geometry, the first area greater than the second area, the first time after the second time.

The apparatus of any preceding clause, wherein the plate includes a plurality of through openings.

The apparatus of any preceding clause, wherein the first ambient condition includes a first temperature, the second ambient condition includes a second temperature, the first temperature greater than the second temperature.

The apparatus of any preceding clause, wherein the plate includes a shape memory alloy.

The apparatus of any preceding clause, wherein the plate includes a first layer including a first material having a first coefficient of thermal expansion, and a second layer including a second material having a second coefficient of thermal expansion.

The apparatus of any preceding clause, wherein the plate includes a curvature in the second geometry and the plate is approximately planar in the first geometry.

The apparatus of any preceding clause, wherein the plate is a first plate, and the apparatus further including a second plate coupled to the member, the first plate including a first side, the second plate including a second side adjacent to the first side, the second plate having the first geometry at the first ambient condition, and the second geometry at the second ambient condition.

The apparatus of any preceding clause, wherein the member includes at least one of (1) a strut, (2) a honeycomb lattice, or (3) a corrugated sheet.

The apparatus of any preceding clause, wherein the plate is a first plate, wherein the member is a first member, the first plate including a first end and a second end, and the apparatus further includes a second plate including a third end, and a fourth end, a joint coupling the third end to the first end, and a second member extending between the fourth end and the first end, the second member exerting a biasing force on the first plate.

The apparatus of any preceding clause, wherein the first plate is parallel to and engaged with the second plate in the first geometry and the fourth end and the first end are spaced in the second geometry.

The apparatus of any preceding clause, wherein the second member is V-shaped.

The apparatus of any preceding clause, wherein the first plate includes a first plurality of openings, the second plate includes a second plurality of openings aligned with the first plurality of openings when the first plate has the first geometry.

The apparatus of any preceding clause, wherein the second member includes a spring, the first ambient condition includes a first pressure, the second ambient condition includes a second pressure, the second pressure greater than the first pressure.

The apparatus of any preceding clause, wherein the second member includes a shape memory alloy.

The apparatus of any preceding clause, wherein the second member includes a first layer including a first material having a first coefficient of thermal expansion, and a second layer including a second material having a second coefficient of thermal expansion.

The apparatus of any preceding clause, wherein the plate is a first plate, the member is a first member, the first plate including a first end, and the apparatus further includes a second plate engaged within the first plate in the second geometry, and a third plate engaged with the second plate in the second geometry.

The apparatus of any preceding clause, wherein the plate is a first plate, the first plate including a first portion and a second portion, and the apparatus further includes a second plate spaced from the first plate, the second plate including a third portion parallel to the first portion in the first geometry and the second geometry, and a fourth portion parallel to the second portion in the first geometry, the fourth portion deflected from the second portion in the second geometry.

A compressor including the apparatus of any preceding clause, wherein the compressor defines a radial axis, an axial axis, and a circumferential axis and the member extends circumferentially between the wall and the plate.

The compressor of any preceding clause, wherein the flow path is a bleed flow path, the wall is a first wall, and the compressor includes a casing defining a main flow path, and the bleed slot includes the first wall, and a second wall downstream of the first wall relative to the main flow path, and wherein the plate is deflected toward the first wall in the first geometry.

A gas turbine engine including the compressor of any preceding clause, and a combustion section coupled to the compressor.

A compressor defining a radial axis, an axial axis, and a circumferential axis, the compressor comprising a compressor case including a bleed slot including a wall, a wall structure including a member to be coupled to the wall, and a plate coupled to the member, the plate having a first geometry at a first ambient condition at a first time, the flow path having a first area when the plate has the first geometry and a second geometry at a second ambient condition at a second time, the flow path having a second area when the plate has the second geometry, the first area is greater than the second area, and the first time is after the second time.

The compressor of any preceding clause, wherein the flow path is a bleed flow path, the wall is a first wall, and the bleed slot further includes a second wall downstream of the first wall relative to the main flow path, the plate is deflected toward the first wall in the first geometry.

A gas turbine engine including a compressor including a compressor case including a bleed slot including a wall, a wall structure including a member to be coupled to the wall, and a plate coupled to the member, the plate having a first geometry at a first ambient condition at a first time, the flow path having a first area when the plate has the first geometry and a second geometry at a second ambient condition at a second time, the flow path having a second area when the plate has the second geometry, the first area is greater than the second area, and the first time is after the second time and a combustion section coupled to the compressor.

The following claims are hereby incorporated into this Detailed Description by this reference. Although certain example systems, apparatus, articles of manufacture, and methods have been disclosed herein, the scope of coverage of this document is not limited thereto. On the contrary, this document covers all systems, apparatus, articles of manufacture, and methods fairly falling within the scope of the claims of this document.

What is claimed is:

1. An apparatus to be coupled to a wall of a bleed slot of a compressor of a gas turbine engine, the bleed slot defining a flow path, the apparatus comprising:
   a member to be coupled to the wall; and
   a plate coupled to the member, the plate including a plurality of openings, the plate having:
      a first geometry at a first ambient condition at a first time, the flow path having a first area when the plate has the first geometry; and
      a second geometry at a second ambient condition at a second time, the flow path having a second area when the plate has the second geometry, the first area is greater than the second area, and the first time is after the second time.

2. The apparatus of claim 1, wherein the first ambient condition includes a first temperature, the second ambient condition includes a second temperature, and the first temperature is greater than the second temperature.

3. The apparatus of claim 2, wherein the plate includes a shape memory alloy.

4. The apparatus of claim 2, wherein the plate includes:
a first layer including a first material having a first coefficient of thermal expansion; and
a second layer including a second material having a second coefficient of thermal expansion.

5. The apparatus of claim 1, wherein the plate includes a curvature in the second geometry and the plate is planar in the first geometry.

6. The apparatus of claim 5, wherein the plate is a first plate, and the apparatus further including a second plate coupled to the member, the first plate including a first side, the second plate including a second side adjacent to the first side, the second plate having the first geometry at the first ambient condition and having the second geometry at the second ambient condition.

7. The apparatus of claim 1, wherein the member includes at least one of (1) a strut, (2) a honeycomb lattice, or (3) a corrugated sheet.

8. The apparatus of claim 1, wherein the plate is a first plate, wherein the member is a first member, the first plate including a first end and a second end, and the apparatus further includes:
a second plate including:
a third end; and
a fourth end;
a joint coupling the third end to the first end; and
a second member extending between the fourth end and the first end, the second member exerting a biasing force on the first plate.

9. The apparatus of claim 8, wherein the first plate is parallel to and engaged with the second plate in the first geometry and the fourth end and the first end are spaced in the second geometry.

10. The apparatus of claim 8, wherein the second member is V-shaped.

11. The apparatus of claim 8, wherein the first plate includes a first plurality of openings, the second plate includes a second plurality of openings aligned with the first plurality of openings when the first plate has the first geometry.

12. The apparatus of claim 8, wherein the second member includes a spring, the first ambient condition includes a first pressure, the second ambient condition includes a second pressure, the second pressure greater than the first pressure.

13. The apparatus of claim 8, wherein the second member includes a shape memory alloy.

14. The apparatus of claim 8, wherein the second member includes:
a first layer including a first material having a first coefficient of thermal expansion; and
a second layer including a second material having a second coefficient of thermal expansion.

15. The apparatus of claim 1, wherein the plate is a first plate, the member is a first member, the first plate including a first end, and the apparatus further includes:
a second plate engaged within the first plate in the second geometry; and
a third plate engaged with the second plate in the second geometry.

16. The apparatus of claim 1, wherein the plate is a first plate, the first plate including a first portion and a second portion, and the apparatus further includes a second plate spaced from the first plate, the second plate including:
a third portion parallel to the first portion in the first geometry and the second geometry; and
a fourth portion parallel to the second portion in the first geometry, the fourth portion deflected from the second portion in the second geometry.

17. A compressor defining a radial axis, an axial axis, and a circumferential axis, the compressor comprising:
a compressor case including a bleed slot including a wall, the bleed slot defining a flow path;
a wall structure including:
a member to be coupled to the wall; and
a plate coupled to the member, the plate including a plurality of openings, the plate having:
a first geometry at a first ambient condition at a first time, the flow path having a first area when the plate has the first geometry; and
a second geometry at a second ambient condition at a second time, the flow path having a second area when the plate has the second geometry, the first area is greater than the second area, and the first time is after the second time.

18. The compressor of claim 17, wherein the flow path is a bleed flow path, the wall is a first wall, and the bleed slot further includes a second wall downstream of the first wall relative to a main flow path through the compressor case, the plate is deflected toward the first wall in the first geometry.

19. A gas turbine engine including:
a compressor including:
a compressor case
a bleed slot including a wall, the bleed slot defining a flow path;
a wall structure including:
a member to be coupled to the wall; and
a plate coupled to the member, the plate including:
a first layer including a first material having a first coefficient of thermal expansion; and
a second layer including a second material having a second coefficient of thermal expansion, the plate having:
a first geometry at a first ambient condition at a first time, the first ambient condition including a first temperature, the flow path having a first area when the plate has the first geometry; and
a second geometry at a second ambient condition at a second time, the second ambient condition including a second temperature, the first temperature is greater than the second temperature, the flow path having a second area when the plate has the second geometry, the first area is greater than the second area, and the first time is after the second time; and
a combustion section coupled to the compressor.

* * * * *